United States Patent
Krueger et al.

(10) Patent No.: US 11,620,217 B2
(45) Date of Patent: Apr. 4, 2023

(54) PARTITION IDENTIFIER SPACE SELECTION

(71) Applicant: Arm Limited, Cambridge (GB)

(72) Inventors: Steven Douglas Krueger, Austin, TX (US); Yuval Elad, Cambridge (GB)

(73) Assignee: Arm Limited, Cambridge (GB)

( * ) Notice: Subject to any disclaimer, the term of this patent is extended or adjusted under 35 U.S.C. 154(b) by 52 days.

(21) Appl. No.: 17/218,718

(22) Filed: Mar. 31, 2021

(65) Prior Publication Data

US 2022/0318140 A1 Oct. 6, 2022

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0644* (2013.01); *G06F 3/0673* (2013.01); *G06F 2212/68* (2013.01)

(58) Field of Classification Search
CPC .. G06F 12/0802; G06F 3/0604; G06F 3/0644; G06F 3/0673; G06F 2212/68
See application file for complete search history.

(56) References Cited

U.S. PATENT DOCUMENTS

| | | | |
|---|---|---|---|
| 5,721,858 A * | 2/1998 | White | G06F 12/1036 711/208 |
| 10,664,306 B2 * | 5/2020 | Krueger | G06F 3/0659 |
| 2003/0084256 A1 * | 5/2003 | McKee | G06F 12/1491 711/206 |
| 2004/0158727 A1 | 8/2004 | Watt et al. | |
| 2006/0143411 A1 | 6/2006 | O'Connor | |
| 2009/0320048 A1 | 12/2009 | Watt et al. | |

(Continued)

FOREIGN PATENT DOCUMENTS

CN 100350388 C 11/2007

(Continued)

OTHER PUBLICATIONS

"ARM Security Technology; Building a Secure System using TrustZone® Technology", ARM, PRD29-GENC-009492C, 2005-2009, 108 pages.

(Continued)

*Primary Examiner* — Zhuo H Li
(74) *Attorney, Agent, or Firm* — Nixon & Vanderhye P.C.

(57) ABSTRACT

Processing circuitry processes instructions in one of at least three domains each associated with a corresponding physical address space, and issues a memory access request to a memory system, the memory access request comprising a partition identifier (selected based on programmable partition identifier selection information associated with a current software execution environment which caused the memory access request to be issued) and a multi-bit partition identifier space indicator indicating a selected partition identifier space (selected from among at least three partition identifier spaces based on a current domain of the processing circuitry). The selected partition identifier space and partition identifier together represent information for selecting, at a memory system component, parameters for controlling allocation of resources for handling the memory access request or managing contention for said resources, or for selecting whether performance monitoring data is updated in response to the memory access request.

20 Claims, 17 Drawing Sheets

(56) References Cited

U.S. PATENT DOCUMENTS

| | | | |
|---|---|---|---|
| 2014/0181821 A1* | 6/2014 | Shavit | G06F 9/467 |
| | | | 718/101 |
| 2018/0203609 A1* | 7/2018 | Krueger | G06F 3/0653 |
| 2018/0203610 A1 | 7/2018 | Krueger | |
| 2018/0203807 A1 | 7/2018 | Krueger | |
| 2021/0073131 A1 | 3/2021 | Krueger | |
| 2022/0058121 A1* | 2/2022 | Hornung | G06F 12/0862 |
| 2022/0066840 A1* | 3/2022 | Rutland | G06F 9/524 |

OTHER PUBLICATIONS

"Improving Real-Time Performance by Utilizing Cache Allocation Technology; Enhancing Performance via Allocation of the Processor's Cache", Intel®, White Paper, Document No. 331843-001US, Apr. 2015, 16 pages.

N. Khang, "Benefits of Intel Cache Monitoring Technology in the Intel Xeon Processor E5 v3 Family", Intel® Software, Jul. 11, 2016, submitted Sep. 8, 2014, 2 pages, https://software.intel.com/en-us/blogs/2014/06/18/benefit-of-cache-monitoring.

N. Khang, "Introduction to Cache Allocation Technology in the Intel® Xeon® Processor E5 v4 Family", Intel® Software, Jul. 11, 2016, submitted Feb. 11, 2016, 4 pages, https://software.intel.com/en-us/articles/introduction-to-cache-allocation-technology.

N. Khang, "Introduction to Memory Bandwidth Monitoring in the Intel® Xeon® Processor E5 v4 Family", Intel® Software, Jul. 11, 2016, submitted Feb. 11, 2016, 3 pages, https://software.intel.com/en-us/articles/introduction-to-memory-bandwidth-monitoring.

International Search Report and Written Opinion of the International Searching Authority for PCT/GB2022/050387 dated May 11, 2022, 12 pages.

* cited by examiner

PARTITION IDENTIFIER SPACE SELECTION

BACKGROUND

Technical Field

The present technique relates to the field of data processing.

Technical Background

Two or more software execution environments, such as applications or virtual machines, may be executed on the same data processing system with access to a common memory system shared between software execution environments. For some systems it may be important that the performance of one software execution environment is not held back due to another software execution environments using too much resource in the shared memory system. This problem can be referred to as the "noisy neighbour" problem and can be particularly significant for enterprise networking or server systems for example.

SUMMARY

At least some examples provide an apparatus comprising:
processing circuitry to process instructions in one of at least three domains each associated with a corresponding physical address space, and to issue to a memory system a memory access request specifying a target address indicative of a target memory system location;
partition identifier selection circuitry to select a partition identifier based on programmable partition identifier selection information associated with a current software execution environment which caused the memory access request to be issued; and
partition identifier space selection circuitry to select a selected partition identifier space from among at least three partition identifier spaces based on a current domain of the processing circuitry; in which:
the selected partition identifier space and the partition identifier together represent information for selecting, at a memory system component of the memory system, a set of one or more memory system resource control parameters for controlling allocation of resources for handling the memory access request or managing contention for said resources, or selecting, at the memory system component, whether performance monitoring data is updated in response to the memory access request; and the processing circuitry is configured to issue the memory access request to the memory system with the memory access request specifying the partition identifier and a partition identifier space indicator comprising a plurality of bits indicating the selected partition identifier space selected by the partition identifier space selection circuitry.

At least some examples provide a memory system component comprising:
memory access request receiving circuitry to receive a memory access request specifying a target address indicative of a target memory system location in a memory system, a partition identifier space indicator comprising a plurality of bits indicating a selected partition identifier space selected from among at least three partition identifier spaces, and a partition identifier associated with a current software execution environment which caused the memory access request to be issued; and
at least one of:
resource control circuitry to select a set of one or more memory system resource control parameters based on the partition identifier space indicator and the partition identifier, and based on the selected set of memory system resource control parameters, to control allocation of resources for handling the memory access request or manage contention for said resources; and/or
performance monitoring control circuitry to control, based on the partition identifier space indicator and the partition identifier, whether performance monitoring data is updated in response to the memory access request.

At least some examples provide a method comprising:
processing instructions in one of at least three domains each associated with a corresponding physical address space;
selecting a partition identifier based on programmable partition identifier selection information associated with a current software execution environment which caused the memory access request to be issued;
selecting a selected partition identifier space from among at least three partition identifier spaces based on a current domain of the processing circuitry; and
issuing to a memory system a memory access request specifying a target address indicative of a target memory system location, the partition identifier and a partition identifier space indicator comprising a plurality of bits indicating the selected partition identifier space; and
at least one of:
selecting a set of one or more memory system resource control parameters based on the partition identifier space indicator and the partition identifier, and based on the selected set of memory system resource control parameters, controlling allocation of resources for handling the memory access request or managing contention for said resources; and/or
controlling, based on the partition identifier space indicator and the partition identifier, whether performance monitoring data is updated in response to the memory access request.

Further aspects, features and advantages of the present technique will be apparent from the following description of examples, which is to be read in conjunction with the accompanying drawings.

DESCRIPTION OF EXAMPLES

Figure 1:
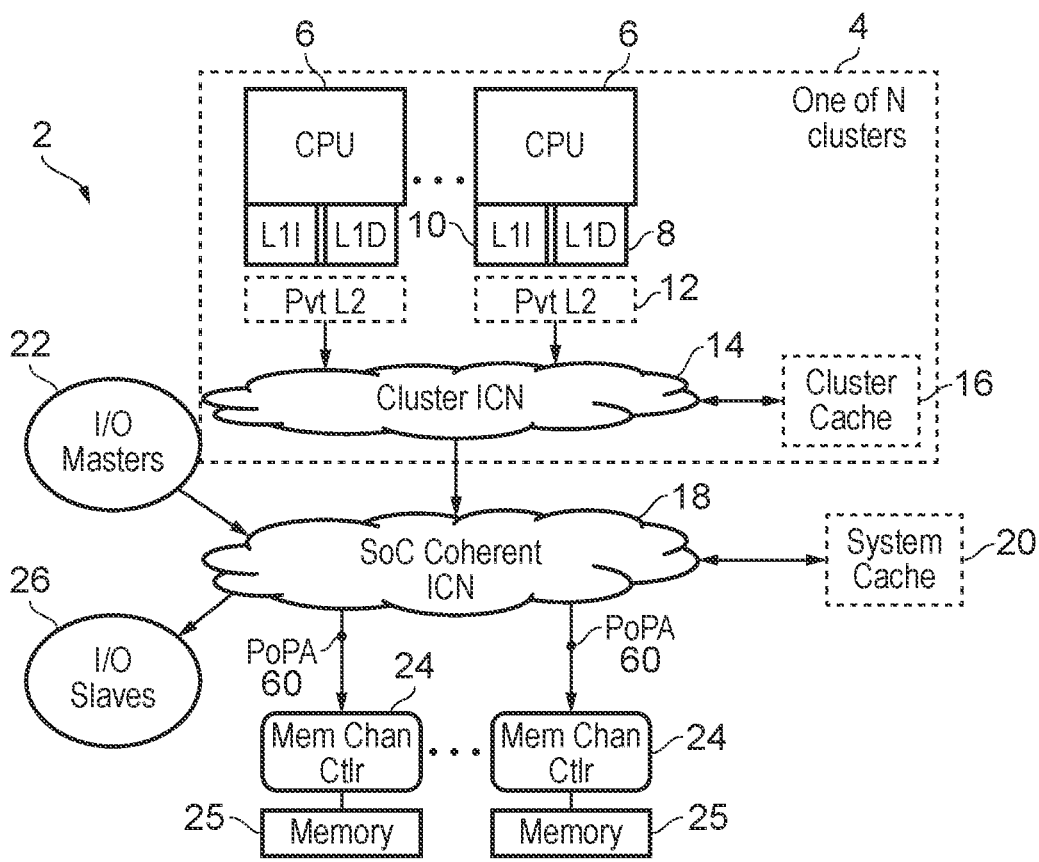
FIG. 1 schematically illustrates an example of a data processing system comprising a memory system.

An apparatus may have processing circuitry to process instructions and to issue to a memory system a memory access request specifying a target address indicative of a target memory system location. Partition ID selection circuitry may be provided to select a partition identifier (ID) based on programmable partition ID selection information associated with a current software execution environment which caused the memory access request to be issued. The selected partition ID may be used by a memory system component of the memory system to select a set of one or more memory system resource control parameters for controlling allocation of resources for handling the memory access request or managing contention for the resources, or to select at the memory system component whether performance monitoring data is updated in response to the access request. Hence, the partition ID may be presented as a label for a memory access requests which can be used to distinguish different software which issued memory access requests, so that resources in the memory system can be partitioned between software execution environments to avoid one software execution environment taking more than its fair share of resource, to address the noisy neighbour problem described above, and/or performance monitoring for the different pieces of software or subsets of software associated with different partition IDs can be performed at memory system components, to enable more precise information on the performance perceived by different software to be gathered. Either way this can help with addressing the noisy neighbour problem.

The processing circuitry may process instructions in one of at least three domains each associated with a corresponding physical address space. Physical addresses may be used in data processing systems to refer to locations within the memory system, but the processing system may support use of virtual memory where address translation circuitry may be used to translate a virtual address specified by instructions executed on the processing circuitry into a corresponding physical address associated with the location and the memory system to be accessed. Mappings between virtual addresses and physical addresses may be defined in one or more page table structures. The page table entries within the page table structures could also define some access permission information which may control whether a given software process executing on the processing circuitry is allowed to access a particular virtual address.

In some processing systems, all virtual addresses may be mapped by the address translation circuitry onto a single physical address space which is used by the memory system to identify locations in memory to be accessed. In such a system, control over whether a particular software process can access a particular address is provided based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support operation in a number of domains and a number of distinct physical address spaces may be supported, where for at least some components of the memory system, memory access requests whose virtual addresses are translated into physical addresses in different physical address spaces are treated as if they were accessing completely separate addresses in memory, even if the physical addresses in the respective physical address spaces actually correspond to the same location in memory. By isolating accesses from different domains of operation of the processing circuitry into respective distinct physical address spaces as viewed by some memory system components, this can provide a stronger security guarantee which does not rely on page table permission information set by an operating system or hypervisor.

Some systems which support distinct physical address spaces in this way may only support two domains each associated with a corresponding physical address space, to allow secure software operating in a secure domain to be isolated from less secure software operating in a less secure domain. However, increasingly there is a desire for a software provider to be provided with a secure computing environment which limits the need to trust other software providers associated with other software executing on the same hardware platform. For example, there may be a number of uses in fields such as mobile payment and banking, enforcement of anti-cheating or pirating mechanisms, security enhancements for secure virtual machine hosting in a cloud system, confidential computing, etc., where a party providing software code may not be willing to trust another party which provides software code to be executed on the same physical platform. Increasingly this may even be the case between two or more different parties which each want to be provided with secure computing environments isolated from a less secure environment associated with normal application-level code, but do not trust each other, and so it may be useful to be able to support three or more distinct domains each associated with a corresponding physical address space. In some examples there may be four or more domains, and so the processing circuitry may support selection between at least four different physical address spaces.

In the examples discussed below, partition ID space selection circuitry is provided to select a selected partition ID space from among at least three partition ID spaces based on a current domain of the processing circuitry. The selected partition ID space is used together with the partition ID of a memory access request as information for selecting the set of memory system resource control parameters or selecting whether performance data is updated in response to the memory access request, as discussed above to enable the performance partitioning of memory resources and performance monitoring. When a memory access request is issued to the memory system by the processing circuitry, the memory access request specifies both the partition ID and a partition ID space indicator comprising a plurality of bits indicating the selected partition ID space selected by the partition ID space selection circuitry.

By supporting at least three partition ID spaces which can be selected based on the current domain of the processing circuitry, this means that the same partition ID could be used in different domains but requests specifying that partition ID can be distinguished as corresponding to a different set of memory system resource control parameters or be distinguished for the purpose of performance monitoring by the memory system component. An alternative would be to support fewer partition ID spaces than the number of domains and physical address spaces supported by the processing circuitry, which would be a valid design choice but may have a disadvantage in that if software in two or more different domains has to share the same partition ID space then this may require the software which manages allocation of partition IDs in the different domains to be coordinated with each other to ensure that there is no aliasing of the partition IDs used in the different domains in a way that would affect the performance guarantees sought by the software in a given domain through use of the partition IDs. Requiring the software for the different domains to be developed in coordination may increase software development cost.

In the examples below, by supporting at least three partition ID spaces corresponding to the at least three domains supported by the processing circuitry and selecting between the at least three partition ID spaces based on the current domain, and using a partition ID space indicator within the memory access request which includes two or more bits to enable the three or more partition ID spaces to be distinguished, this reduces the need for software in different domains to be coordinated with each other to avoid inappropriate aliasing of partition IDs. By maintaining non-coordinated partition ID managers this simplifies software development. Software in each domain may have the freedom to select any partition ID as they choose without worrying whether software in another domain may have used a conflicting partition ID.

In summary, examples discussed below provide processing circuitry which processes instructions in one of at least three domains each associated with a corresponding physical address space, and issues a memory access request to a memory system, the memory access request comprising a partition ID (selected based on programmable partition ID selection information associated with a current software execution environment which caused the memory access request to be issued) and a multi-bit partition ID space indicator indicating a selected partition ID space (selected from among at least three partition ID spaces based on a current domain of the processing circuitry). The selected partition ID space and partition ID together represent information for selecting, at a memory system component, parameters for controlling allocation of resources for handling the memory access request or managing contention for said resources, or information for selecting, at the memory system component, whether performance monitoring data is updated in response to the memory access request.

The current domain of the processing circuitry may not be the only information used to select the selected partition ID space to use for a given memory access request. In some examples the selected partition ID space may be selected based on both the current domain of the processing circuitry and on programmable control information. For example, control state in one or more registers could be used to select the selected partition ID space. The programmable control information may be programmable by software to influence which partition ID space is selected for a given memory access request. While it can be useful in hardware to be able to support each domain having a corresponding partition ID space, not all software may need to use separate partition ID spaces for each domain and in some cases it may be desirable for software in different domains to operate using a common partition ID space, for example when executing legacy software designed for a system with fewer partition ID spaces or when executing software provided by a single provider which includes sub-compartments operating in different domains so that the software in the different domains can trust a common piece of software to manage the allocation of partition IDs for those sub-compartments. In this case, it may be desirable to simplify management of partition IDs by using a coordinated partition ID manager software component. Therefore, providing support for varying which partition ID space is selected for a given domain based on the programmable control information can be useful to support different software usage models.

The programmable control information could be defined in different ways, and in some implementations it may be possible to select, as the selected partition ID space to be used for a given domain, any of the supported partition ID spaces. Hence, in some systems it may be desirable to support a free choice of which partition ID space is used for a given access and so the programmable control information could include partition ID space selection information which can indicate that any one of the supported partition ID spaces can be selected.

However, in other examples the options available may be more restricted so that for at least some domains, it is not possible to select all of the available partition ID spaces supported in hardware, so that there may be a more limited choice of partition ID spaces in at least some domains. Limiting the options available for selection could be useful for a number of reasons, e.g. to avoid a less secure state selecting the partition ID space associated with a more secure state, and/or to reduce the complexity of the hardware and the amount of control state needed, resulting in reduced circuit area and power cost for the processor.

In some examples, the partition ID space selection circuitry may select, based on the programmable control information, whether the selected partition ID space should be a primary partition ID space associated with a current domain or an alternative partition ID space associated with the current domain. For at least one of the at least three domains, the alternative partition ID space may be the primary partition ID space that is associated with a different domain. Hence, with this approach each domain may have its own primary partition ID space, but there may also be programmable support for selecting, for use in one domain, an alternative partition ID space that is the same as the primary partition ID space associated with a different domain, so that it is possible for two domains to be programmed to use the same partition ID space. The definition of which particular partition ID space is the alternative partition ID space for a given domain may vary depending on the particular architecture implementation. In general, supporting a primary partition ID space and an alternative partition ID space for each domain may be sufficient to support expected software usage models and can be a less complex option to implement than supporting a wider choice of partition ID spaces.

The primary partition ID space for a given domain may be fixed for that domain, independent of the programmable control information. For some domains the alternative partition ID space could also be fixed, so that it is not possible to vary which partition ID space is the alternative partition ID space for that domain, with the programmable control information merely selecting whether the primary or alternative partition ID space is used.

However, in some examples for at least one domain, the alternative partition ID space associated with that domain may be a partition ID space variably selected depending on the programmable control information. This could allow a wider choice of partition ID spaces to be chosen as the alternative partition ID space which may be useful for some domains, for example a root domain which may have oversight of other domains (e.g. the root domain may be for executing code for switching the processing circuitry between the other domains) and for which it may be useful to support a wider choice of alternative partition ID spaces.

The processing circuitry may support processing of instructions at one of a number of different privilege levels, and for at least one privilege level, at least part of the programmable control information which controls selection of the selected partition ID space for memory access requests issued at the at least one privilege level may be programmable at a more privileged privilege level than the at least one privilege level. Hence, more privileged software may set the programmable control information which constrains which partition ID space should be selected for less privileged software.

In some scenarios it can be useful for the software at the lower privilege level to have visibility of which partition ID space is selected for that privilege level based on the programmable control information programmable and more privileged privilege level. Therefore, in some implementations, at least for a subset of the at least one privilege level, the processing circuitry can make accessible, to at least one instruction executed at a privilege level of that subset, forced space indicating information indicative of the partition ID space selected for that current privilege level based on the programmable control information programmable at the more privileged privilege level. For example, software at a given privilege level (e.g. an operating system privilege level) may be allowed to allocate partition IDs but not change the partition ID space selected for requests issued at that given privilege level or a less privileged privilege level, but it could nevertheless be useful for that software to determine whether the partition ID space is the partition ID space for the current domain or an alternative partition ID space, as this may affect how partition IDs are allocated by that software (e.g. whether coordination with another software execution environment may be needed).

In some examples, where the processing circuitry supports processing of instructions at one of two or more different privilege levels, the programmable control information may include: hierarchical control enable information programmable at a first privilege level, and space selection control information programmable at a second privilege level less privileged than the first privilege level; in which when the hierarchical control information has a first value, the partition ID selection circuitry is configured to select the selected partition ID space for memory access requests issued at the second privilege level or a third privilege level less privileged than the second privilege level depending on the space selection control information programmable at the second privilege level; and when the hierarchical control information has a second value, the partition ID selection circuitry is configured to select the selected partition ID space for memory access requests issued at the second privilege level or the third privilege level independent of the space selection control information programmable at the second privilege level.

With this approach the software operating at the first privilege level (with greatest privilege among the first, second and third privilege levels) is able to control whether software operating at the second privilege level is allowed to influence selection of the selected partition ID space for memory access requests issued at the second or third privilege level using the programmable control information. This hierarchical control scheme can be useful for supporting different software usage models, where some software at the first privilege level may wish to delegate responsibility for controlling which partition ID space is selected to code operating at the second privilege level, while other software at the first privilege level may prefer to set control state for controlling selection of the partition ID space itself, without allowing code operating at the second privilege level to influence the selection of partition ID space for memory access requests issued at the second or third privilege level.

The partition ID and the partition ID space together represent information for selecting memory system resource control parameters or controlling whether performance monitoring data is updated. This may influence the level of performance achieved for certain memory access requests or the view of performance gathered using the performance monitoring, but a functional result of processing the memory access request may be independent of the partition ID and the selected partition ID space. Hence, which particular memory system location is accessed corresponding to the target address does not depend on the partition ID and the selected partition ID space. Similarly, whether or not the memory access request is permitted or rejected does not depend on the partition ID and the selected partition ID space.

The apparatus may have physical address space selection circuitry to select a selected physical address space for the memory access request based on the current domain and the processing circuitry may issue the memory access request specifying a physical address space indicator indicative of the selected physical address space. For example, the physical address space selection circuitry could be part of a memory management unit for performing address translation, or could be part of a physical address space filter for performing checks to determine whether code operating in the current domain is allowed to access a physical address within the selected physical address space.

The physical address space selection circuitry may select the selected physical address space based on the current domain and based on physical address space selection information specified in an address translation entry providing address translation information for the memory access request. Hence, for a memory access made from a given domain as the current domain, the memory access request may specify as the selected physical address space a physical address space associated with a different domain to the current domain, based on information specified in the address translation entry. This can be useful, for example, for allowing software in different domains to share access to a shared variable in memory. There may be some constraints on which domains are allowed to access each physical address space and there may be some combinations of current domain and physical address space that are not permitted to maintain security (e.g. when the processing circuitry is in a non-secure domain, it may not prohibited for the selected physical address space to be a secure physical address space associated with a secure domain).

The physical address space indicator may be separate from the partition ID space indicator. The selection of the selected partition ID space depending on the current domain may be independent of the physical address space selection information specified in the address translation entry corresponding to the target address of the memory access request. Hence, even if the physical address space selection information indicates that the selected physical address space should be an address space other than physical address space associated with the current domain, the selected partition ID space could still be that current domain's partition ID space, or if selection of the partition ID space based on programmable control information is supported, then the programmable control information could also allow a different selection of the partition ID space compared to the physical address space. This provides flexible support for different software usage models.

Hence, the physical address space indicator may indicate a physical address space of a given domain and the partition ID space indicator could either specify the partition ID space associated with the same domain as the domain whose address space is indicated by the physical address space indicator, or could indicate a partition ID space associated with a different domain from the domain whose physical address space is indicated by the physical address space indicator. Hence, although both selections of the physical address space and selection of the partition ID space may depend on the current domain, separate choices may still be made (e.g. the selected partition ID space may vary depending on programmable control information as discussed above).

The apparatus may comprise a point of physical aliasing (PoPA) memory system component configured to de-alias a plurality of aliasing physical addresses from different physical address spaces which correspond to the same memory system resource, to map any of the plurality of aliasing physical addresses to a de-aliased physical address to be provided to at least one downstream memory system component; and at least one pre-PoPA memory system component provided upstream of the PoPA memory system component, where the at least one pre-PoPA memory system component is configured to treat the aliasing physical addresses from different physical address spaces as if the aliasing physical addresses correspond to different memory system resources.

Hence, the memory system may include a point of physical aliasing (PoPA), which is a point at which aliasing physical addresses from different physical address spaces which correspond to the same memory system resource are mapped to a single physical address uniquely identifying that memory system resource. The memory system may include at least one pre-PoPA memory system component which is provided upstream of the PoPA, which treats the aliasing physical addresses as if they correspond to different memory system resources.

For example, the at least one pre-PoPA memory system component could include a cache or translation lookaside buffer which may cache data, program code or address translation information for the aliasing physical addresses in separate entries, so that if the same memory system resource is requested to be accessed from different physical address spaces, then the accesses will cause separate cache or TLB entries to be allocated. The at least one pre-PoPA memory system component could for example be a data cache, an instruction cache or a unified level 2, level 3 or system cache.

Also, the pre-PoPA memory system component could include coherency control circuitry, such as a coherent interconnect, snoop filter, or other mechanism for maintaining coherency between cached information at respective master devices. The coherency control circuitry could assign separate coherency states to the respective aliasing physical addresses in different physical address spaces. Hence, the aliasing physical addresses are treated as separate addresses for the purpose of maintaining coherency even if they do actually correspond to the same underlying memory system resource. Although on the face of it, tracking coherency separately for the aliasing physical addresses could appear to cause a problem of loss of coherency, in practice this is not a problem because if processes operating in different domains are really intended to share access to a particular memory system resource then they can use a common physical address (e.g. a less secure physical address space) to access that resource. Another example of a pre-PoPA memory system component may be a memory protection engine which is provided for protecting data saved to off-chip memory against loss of confidentiality and/or tampering. Such a memory protection engine could, for example, separately encrypt data associated with a particular memory system resource with different encryption keys depending on which physical address space the resource is accessed from, effectively treating the aliasing physical addresses as if they were corresponding to different memory system resources (e.g. an encryption scheme which makes the encryption dependent on the address may be used, and the physical address space ID may be considered to be part of the address for this purpose).

Regardless of the form of the pre-PoPA memory system component, it can be useful for such a PoPA memory system component to treat the aliasing physical addresses as if they correspond to different memory system resources, as this provides hardware-enforced isolation between the accesses issued to different physical address spaces so that information associated with one domain cannot be leaked to another domain by features such as cache timing side channels or side channels involving changes of coherency triggered by the coherency control circuitry.

It may be possible, in some implementations, for the aliasing physical addresses in the different physical address spaces to be represented using different numeric physical address values for the respective different physical address spaces. This approach may require a mapping table to determine at the PoPA which of the different physical address values correspond to the same memory system resource. However, this overhead of maintaining the mapping table may be considered unnecessary, and so in some implementations it may be simpler if the aliasing physical addresses comprise physical addresses which are represented using the same numeric physical address value in each of the different physical address spaces. If this approach is taken then, at the point of physical aliasing, it can be sufficient simply to discard the physical address space ID which identifies which physical address space is accessed using a memory access, and then to provide the remaining physical address bits downstream as a de-aliased physical address.

Hence, in addition to the pre-PoPA memory system component, the memory system may also include a PoPA memory system component configured to de-alias the plurality of aliasing physical addresses to obtain a de-aliased physical address to be provided to at least one downstream memory system component. The PoPA memory system component could be a device accessing a mapping table to find the de-aliased address corresponding to the aliasing address in a particular address space, as described above. However, the PoPA component could also simply be a location within the memory system where the physical address tag associated with a given memory access is discarded so that the physical address provided downstream uniquely identifies a corresponding memory system resource regardless of which physical address space this was provided from. Alternatively, in some cases the PoPA memory system component may still provide the physical address space tag to the at least one downstream memory system component (e.g. for the purpose of enabling further filter checks at the downstream system component), but the PoPA may mark the point within the memory system beyond which downstream memory system components no longer treat the aliasing physical addresses as different memory system resources, but consider each of the aliasing physical addresses to map the same memory system resource. For example, if a memory controller or a hardware memory storage device downstream of the PoPA receives the physical address tag and a physical address for a given memory access request, then if that physical address corresponds to the same physical address as a previously seen transaction, then any hazard checking or performance improvements performed for respective transactions accessing the same physical address (such as merging accesses to the same address) may be applied even if the respective transactions specified different physical address space tags. In contrast, for a memory system component upstream of the PoPA, such hazard checking or performance improving steps taken for transactions accessing the same physical address may not be invoked if these transactions specify the same physical address in different physical address spaces.

In some examples the apparatus described above may not include the memory system component itself, which could be an external memory system component.

However, in other examples the memory system component may be part of the apparatus itself and the memory system component may comprise at least one of: resource control parameter selection circuitry to select the set of one or more memory system resource control parameters based on the partition ID space indicator and the partition ID; and/or performance monitoring control circuitry to control, based on the partition ID space indicator and the partition ID, whether the performance monitoring data is updated in response to the memory access request.

Where the resource control parameter selection circuitry is provided in the memory system component, the memory system resource control parameters may be mapped to a portion of a physical address space so that those resource control parameters can be updated software executing on the processing circuitry. As there are multiple physical address spaces supported then there are multiple options for selecting which physical address space should be used to access the memory system control parameters for a given partition ID space. In one example, where each of the at least three partition ID spaces is associated with a corresponding one of the at least three domains, a given set of memory system resource control parameters corresponding to a given partition ID space may be accessible in response to a memory access request issued specifying a target address in the physical address space corresponding to the domain that is associated with the given partition ID space. By defining the memory system resource control parameters for the partition ID space associated with a given domain in the physical address space associated with that same given domain, this simplifies management of the memory system resource control parameters and can help to maintain security.

Providing support at the processing side for selecting between at least three partition ID spaces can be useful for the reasons discussed above, but in practice a processing element comprising the processing circuitry, partition ID selection circuitry and the partition ID space selection circuitry described above may be integrated into a data processing system (e.g. a system-on-chip) which may have many different memory system components with which that processing element may communicate. It may take a lot of development effort to upgrade all the memory system components in the system to also support three or more different partition ID spaces and so there may be some legacy components which support fewer partition ID spaces. Therefore, it can be useful to provide bridging circuitry at a boundary between a first region of the apparatus comprising one or more components supporting the at least three partition ID spaces and a second region of the apparatus comprising one or more components supporting fewer partition ID spaces than the one or more components in the first region, where the bridging circuitry is configured to remap the partition ID space indicator for a memory access request passing between the first region and the second region. The mapping used by the bridging circuitry could be a fixed mapping or could be a programmable mapping which can be varied depending on programmable partition ID space mapping information. In some cases the bridging circuitry could also remap the physical address space indicator specified by a given memory access request, in cases where the bridging circuitry is at a point of the system upstream of the PoPA (if the bridging circuitry is downstream of the PoPA then the physical address space indicator may already have been discarded and so remapping of the physical address space indicator may not be needed). In general, by providing the bridging circuitry described above this provides more flexibility to combine different types of memory system components, so that the advantage of the support for multiple partition ID spaces at the processing element can be realised even if not all memory system components also support three or more partition ID spaces.

As mentioned above, in some implementations the memory system component may be considered an external component to the processing element which comprises the processing circuitry, and so the memory system component could be viewed as a standalone product. Hence, the memory system component may in some examples include memory access request receiving circuitry which receives the memory access request (e.g. from a processing element or other element of a system-on-chip), with the memory access request specifying a target address and a partition ID space indicator as discussed above, where the partition ID space includes two or more bits to select a selected partition ID space from among at least three partition ID spaces. The memory access request also specifies a partition ID associated with a current software execution environment which caused the memory access request to be issued, which is defined within the selected partition ID space. The memory component system includes resource control circuitry and/or performance monitoring control circuitry as discussed above to use the partition ID space indicator and the partition ID either to select memory system resource control parameters, or to control whether performance monitoring data is updated, or both.

Memory Resource and Performance Monitoring Partitioning

FIG. 1 schematically illustrates an example of a data processing system 2 comprising N processing clusters 4 (N is 1 or more), where each processing cluster includes one or more processing units 6 such as a CPU (central processing unit) or GPU (graphics processing unit). Each processing unit 6 may have at least one cache, e.g. a level 1 data cache 8, level 1 instruction cache 10 and shared level 2 cache 12. It will be appreciated that this is just one example of a possible cache hierarchy and other cache arrangements could be used. The processing units 6 within the same cluster are coupled by a cluster interconnect 14. The cluster interconnect may have a cluster cache 16 for caching data accessible to any of the processing units.

A system on chip (SoC) interconnect 18 couples the N clusters and any other master devices 22 (such as display controllers or direct memory access (DMA) controllers). The SoC interconnect may have a system cache 20 for caching data accessible to any of the masters connected to it. The SoC interconnect 18 controls coherency between the respective caches 8, 10, 12, 16, 20 according to any known coherency protocol. The SoC interconnect is also coupled to one or more memory controllers 24, each for controlling access to a corresponding memory 25, such as DRAM or SRAM. The SoC interconnect 18 may also direct transactions to other slave devices, such as a crypto unit for providing encryption/decryption functionality.

Hence, the data processing system 2 comprises a memory system for storing data and providing access to the data in response to transactions issued by the processing units 6 and other master devices 22. The caches 8, 10, 12, 16, 20, the interconnects 14, 18, memory controllers 24 and memory devices 25 can each be regarded as a component of the memory system. Other examples of memory system components may include memory management units or translation lookaside buffers (either within the processing units 6 themselves or further down within the system interconnect 18 or another part of the memory system), which are used for translating memory addresses used to access memory, and so can also be regarded as part of the memory system. In general, a memory system component may comprise any component of a data processing system used for servicing memory transactions for accessing memory data or controlling the processing of those memory transactions.

The memory system may have various resources available for handling memory transactions. For example, the caches 8, 10, 12, 16, 20 have storage capacity available for caching data required by a given software execution environment executing on one of the processors 6, to provide quicker access to data or instructions than if they had to be fetched from main memory 25. Similarly, MMUs/TLBs may have capacity available for caching address translation data. Also, the interconnects 14, 18, the memory controller 24 and the memory devices 25 may each have a certain amount of bandwidth available for handling memory transactions.

When multiple software execution environments executing on the processing elements 6 share access to the memory system, it can be desirable to prevent one software execution environment using more than its fair share of resource, to prevent other execution environments perceiving a loss of performance. This can be particularly important for data center (server) applications where there is an increasing demand to reduce capital expenditure by increasing the number of independent software processes which interact with a given amount of memory capacity, to increase utilization of the data center servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single SoC which previously would have been on separate SoCs. This again leads to a desire to limit performance interactions between software execution environments, and to monitor how those need to allow those independent processes to access the shared memory while limiting performance interactions.

Figure 2:
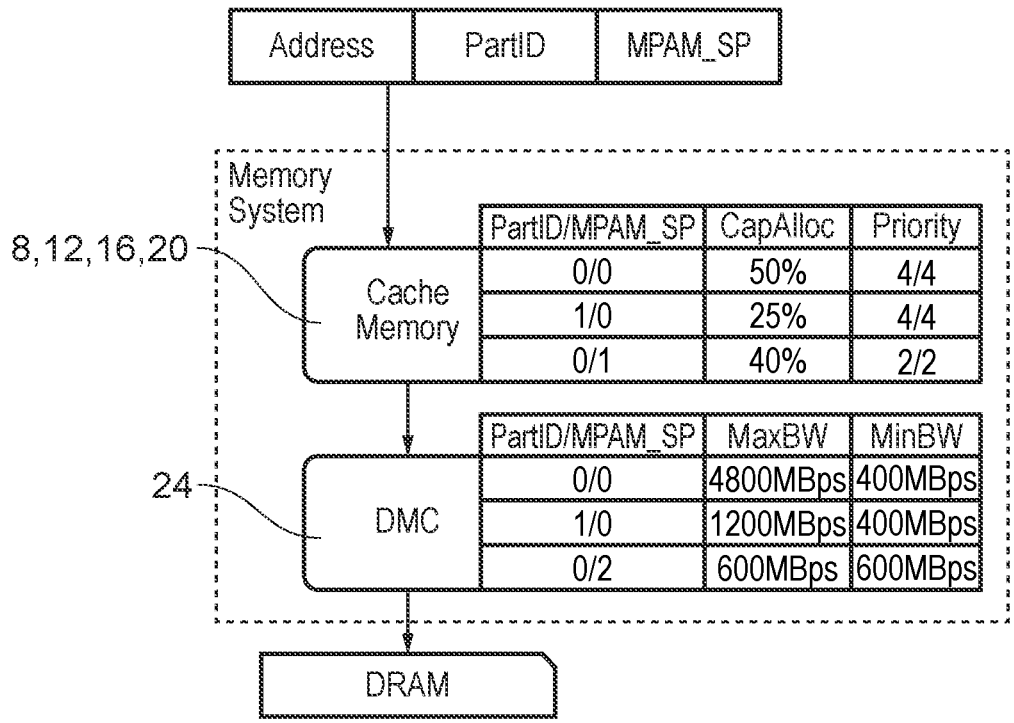
FIG. 2 schematically illustrates an example of partitioning control of memory system resources in dependence on a partition ID allocated to a software execution environment associated with a memory transaction and a partition ID space indicator.

FIG. 2 schematically illustrates an example of partitioning the control of allocation of memory system resources in dependence on the software execution environment which issues the corresponding memory transactions. In this context, a software execution environment may be any process, or part of a process, executed by a processing unit within a data processing system. For example, a software execution environment may comprise an application, a guest operating system or virtual machine, a host operating system or hypervisor, a security monitor program for managing different security states of the system, or a sub-portion of any of these types of processes (e.g. a single virtual machine may have different parts considered as separate software execution environments). As shown in FIG. 2, each software execution environment may be allocated a given partition ID 30 which is passed to the memory system components along with memory transactions that are associated with that software execution environment.

A memory access request issued to the memory component specifies an address, the partition ID (PartID) determined for the corresponding software execution environment, and a partition ID space indicator (MPAM_SP) indicating a selected partition ID space.

Within the memory system component, resource allocation or contention resolution operations can be controlled based on one of a number of sets of memory system component parameters selected based on the partition ID and partition ID space indicator. For example, as shown in FIG. 2, each software execution environment may be assigned an allocation threshold representing a maximum amount of cache capacity that can be allocated for data/instructions associated with that software execution environment, with the relevant allocation threshold when servicing a given transaction being selected based on the partition ID and partition ID space indicator associated with the transaction. For example, in FIG. 2 transactions associated with partition ID 0 and partition ID space indicator 0 may allocate data to up to 50% of the cache's storage capacity, leaving at least 50% of the cache available for other purposes. On the other hand, the same partition ID 0 in a different partition ID space (e.g. with MPAM_SP=1 instead of 0) may correspond to a different set of resource control parameters (e.g. in this example, having a limit of 40% of cache capacity defined).

Similarly, in a memory system component such as the memory controller 24 which has a finite amount of bandwidth available for servicing memory transactions, minimum and/or maximum bandwidth thresholds may be specified for respective combinations of the partition ID and partition ID space indicator. A memory transaction associated with a given partition ID and partition ID space ID can be prioritised if, within a given period of time, memory transactions specifying that partition ID and partition ID space ID have used less than the minimum amount of bandwidth, while a reduced priority can be used for a memory transaction if the maximum bandwidth has already been used or exceeded for transactions specifying the same partition ID and partition ID space indicator.

It will be appreciated that these are just two examples of ways in which control of memory system resources can be partitioned based on the software execution environment that issued the corresponding transactions. In general, by allowing different processes to "see" different partitioned portions of the resources provided by the memory system, this allows performance interactions between the processes to be limited to help address the problems discussed above.

Similarly, the partition ID and partition ID space indicator associated with memory transactions can be used to partition performance monitoring within the memory system, so that separate sets of performance monitoring data can be tracked for each partition ID, to allow information specific to a given software execution environment (or group of software execution environments) to be identified so that the source of potential performance interactions can be identified more easily than if performance monitoring data was recorded across all software execution environments as a whole. This can also help diagnose potential performance interaction effects and help with identification of possible solutions.

An architecture is discussed below for controlling the setting of partition IDs, selection of partition ID space, labelling of memory transactions based on the partition ID set for a corresponding software execution environment, routing the partition IDs through the memory system, and providing partition-based controls at a memory system component in the memory system. This architecture is scalable to a wide range of uses for the partition IDs. The use of the partition IDs is intended to layer over the existing architectural semantics of the memory system without changing them, and so addressing, coherence and any required ordering of memory transactions imposed by the particular memory protocol being used by the memory system would not be affected by the resource/performance monitoring partitioning. When controlling resource allocation using the partition IDs and partition ID space, while this may affect the performance achieved when servicing memory transactions for a given software execution environment, it does not affect the result of an architecturally valid computation. That is, the partition ID and partition ID space does not change the outcome or result of the memory transaction (e.g. what data is accessed), but merely affects the timing or performance achieved for that memory transaction.

Figure 3:
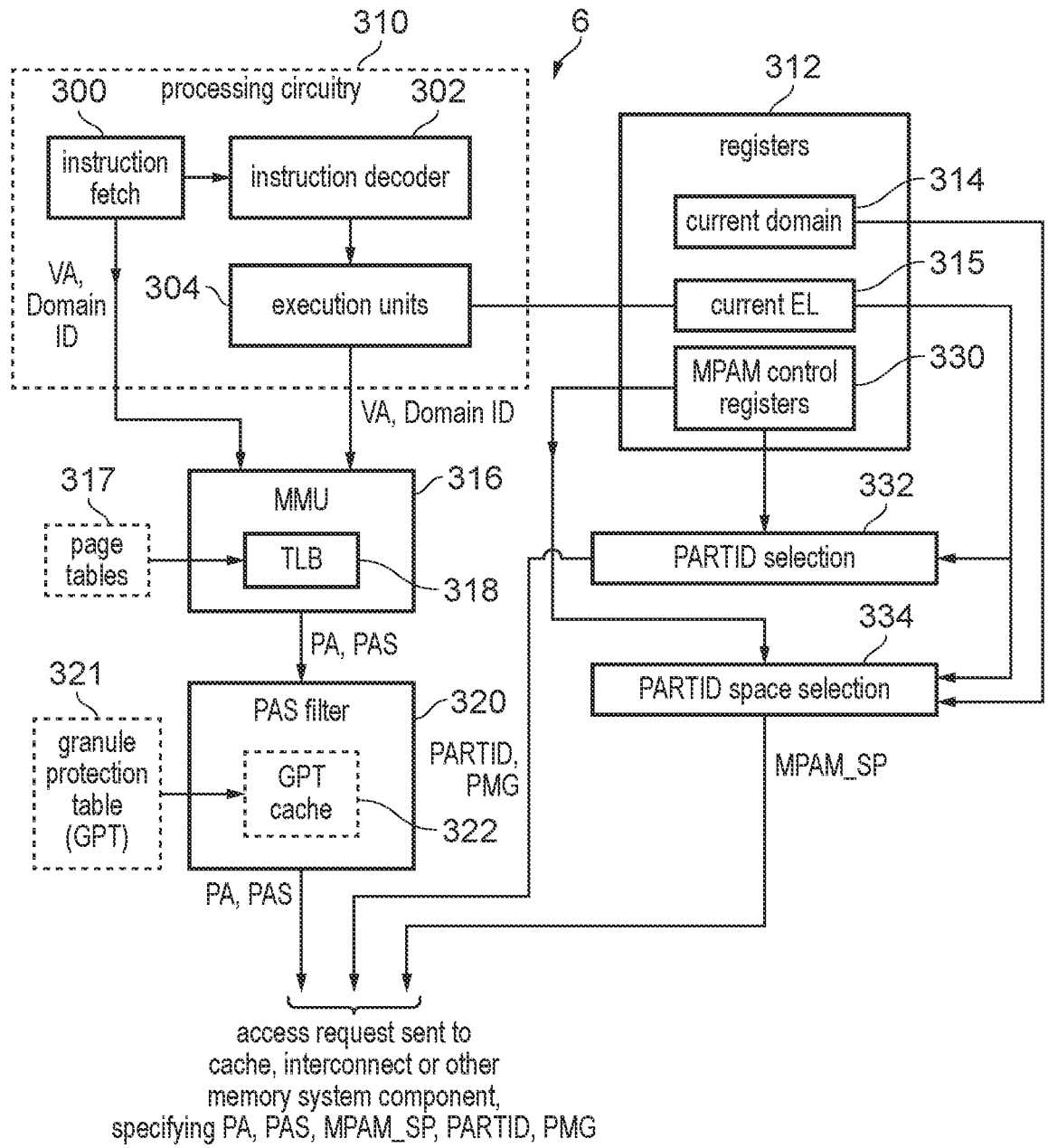
FIG. 3 schematically illustrates an example of an apparatus having processing circuitry, partition ID selection circuitry and partition ID space selection circuitry.

Processing Element Supporting Physical Address Space Selection and Partitioning of Memory Resources and/or Performance Monitoring FIG. 3 shows in more detail some components within a given processing element 6 of the system 2 shown in FIG. 1, for example the processing element may be one of the CPUs 6 shown in FIG. 1. The processing element includes processing circuitry 310 capable of executing instructions according to an instruction set architecture. The processing circuitry 310 includes instruction fetch circuitry 300 for fetching instructions from an instruction cache or from memory, an instruction decoder 302 for decoding the fetched instructions and one or more execution units 304 for executing processing operations in response to the instructions decoded by the instruction decoder 302. Registers 312 are provided for storing operands for instructions executed by the processing circuitry 310, results of executed instructions control data for configuring how processing is performed by the processing circuitry 310.

As discussed further below, the processing circuitry may support execution of instructions in a number of domains of operation (security states), and the registers 312 may include control state used to identify which domain of operation is the current domain. In the example shown in FIG. 3, the registers include a control register providing a current domain indication 314 indicating which domain of operation is the current domain. However, this is not essential and other architectures could determine the current domain based on two or more items of control state which may be stored in different registers or in different parts of the same register, rather than providing a single domain indication identifying the current domain. For example, which domain is the current domain could be determined as a Boolean function of control bits accessible from different system registers.

Also, the processing circuitry may support execution of instructions at a number of exception levels (privilege levels), which may be associated with different levels of privilege so that instructions executed at a more privileged exception level may have greater rights than instructions executed at a less privileged exception level (e.g. being able to carry out operations not permitted for code at a less privileged exception level, or to access data in registers or memory which is not accessible to code at a less privileged exception level). The registers 312 may specify a current exception level (privilege level) indication 315 indicating which exception level is the current exception level in which the processing circuitry 310 is operating. The terms exception level and privilege level are interchangeable in this application.

The processing circuitry 310 is capable of issuing memory access requests specifying a virtual address (VA) and a domain ID (Domain ID or 'security state') identifying the current domain. Address translation circuitry 316 (e.g. a memory management unit (MMU)) translates the virtual address into a physical address (PA) through one of more stages of address translation based on page table data defined in page table structures 317 stored in the memory system. A translation lookaside buffer (TLB) 318 acts as a lookup cache for caching some of that page table information for faster access than if the page table information had to be fetched from memory each time an address translation is required. In this example, as well as generating the physical address, the address translation circuitry 316 also selects one of a number of physical address spaces associated with the physical address and outputs a physical address space (PAS) ID identifying a selected physical address space. Selection of the PAS will be discussed in more detail below.

A PAS filter 320 acts as requester-side filtering circuitry for checking, based on the translated physical address and the PAS ID, whether that physical address is allowed to be accessed within the specified physical address space identified by the PAS ID. This lookup is based on granule protection information stored in a granule protection table structure 321 stored within the memory system. The granule protection information may be cached within a granule protection information cache 322, similar to a caching of page table data in the TLB 318. While the granule protection information cache 322 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 320 determines whether to allow the memory access request to proceed to be issued to one or more caches 8, 10, 12, 16, 20 and/or the interconnect 18. If the specified PAS for the memory access request is not allowed to access the specified physical address then the PAS filter 320 may signal a fault and block effects of the memory access request, e.g. by preventing the request from being passed to the memory system.

While FIG. 3 shows an example where selection of the PAS for a given request is performed by the address translation circuitry 316, in other examples information for determining which PAS to select can be output by the address translation circuitry 316 to the PAS filter 320 along with the PA, and the PAS filter 320 may select the PAS and check whether the PA is allowed to be accessed within the selected PAS.

The provision of the PAS filter 320 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

To support the partitioning of memory system resources and performance monitoring discussed above, the processing element 6 also includes partition ID selection circuitry 332 for selecting a partition ID to specify for a memory access request sent to the cache, interconnect or other memory system component, and partition ID space selection circuitry 334 for selecting a partition ID space within which the partition ID is defined. Both the partition ID selection circuitry 332 and partition ID space selection circuitry 334 may make their selections based on control information such as the current domain 314, the current exception level 315 and information specified in one or more memory partitioning and monitoring (MPAM) control registers 330. These will be discussed in more detail below.

Hence, a memory access request sent to a cache, interconnect or other memory system component specifies a physical address obtained by the MMU 316 in the address translation, a selected physical address space (PAS) selected by physical address space selection circuitry (e.g. the MMU 316 or the PAS filter 320) based on the current domain 314 and information in the page table 317, a partition ID space indicator (MPAM_SP) which identifies a selected partition ID space, and one or more partition IDs (PARTID, PMG) that can be used in combination with the selected partition ID space to control resource control parameter selection or performance monitoring at a memory system component.

Support for Domains Associated with Respective Physical Address Spaces

Figure 4:
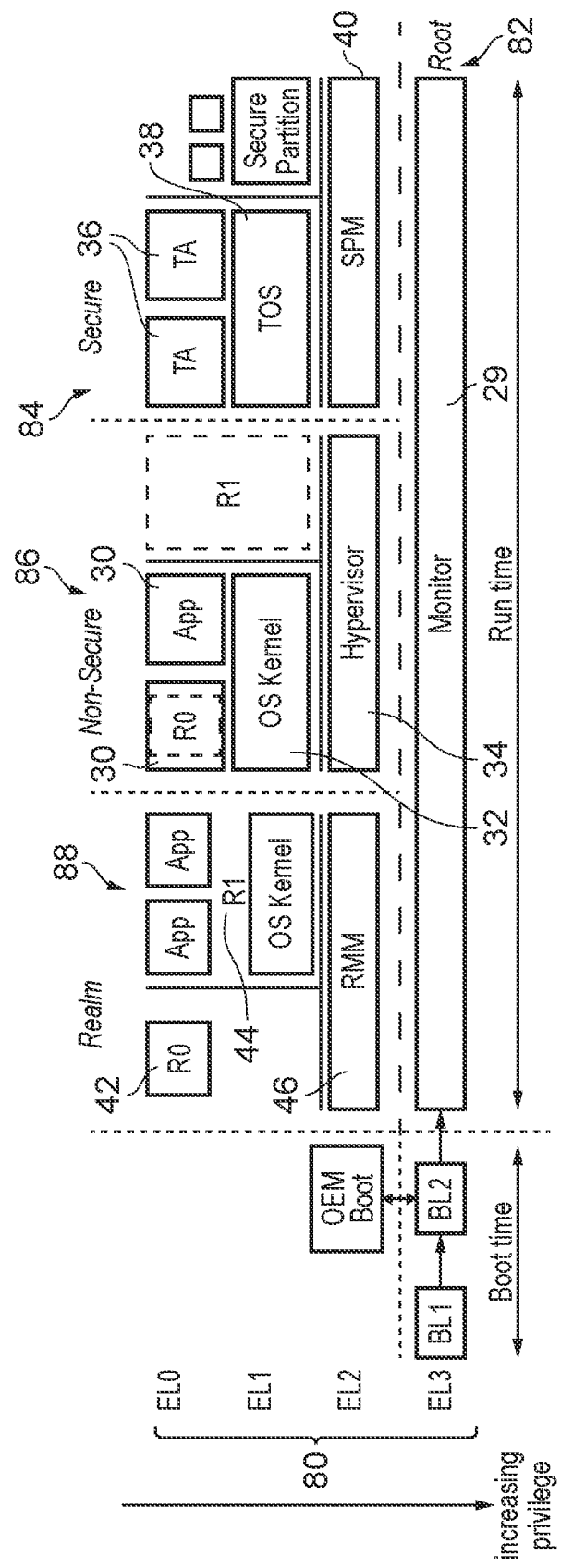
FIG. 4 illustrates a number of domains in which processing circuitry can operate.

FIG. 4 shows an example of different operating states and domains in which the processing circuitry 310 can operate, and an example of types of software which could be executed in the different exception levels and domains (of course, it will be appreciated that the particular software installed on a system is chosen by the parties managing that system and so is not an essential feature of the hardware architecture).

The processing circuitry 310 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level 315 at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 310 is in the highest exception level EL3. When the processing circuitry is in one of the other exception levels EL0 to EL2, the current domain is selected based on the current domain indicator 314, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 310 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 4, an additional domain 88, called the realm domain, is provided which can be used by such user-introduced code to provide a secure computing environment orthogonal to any secure computing environment associated with components operating in the secure domain 84. In the realm domain, the software executed can include a number of realms, where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only trusts the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 4, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 5:
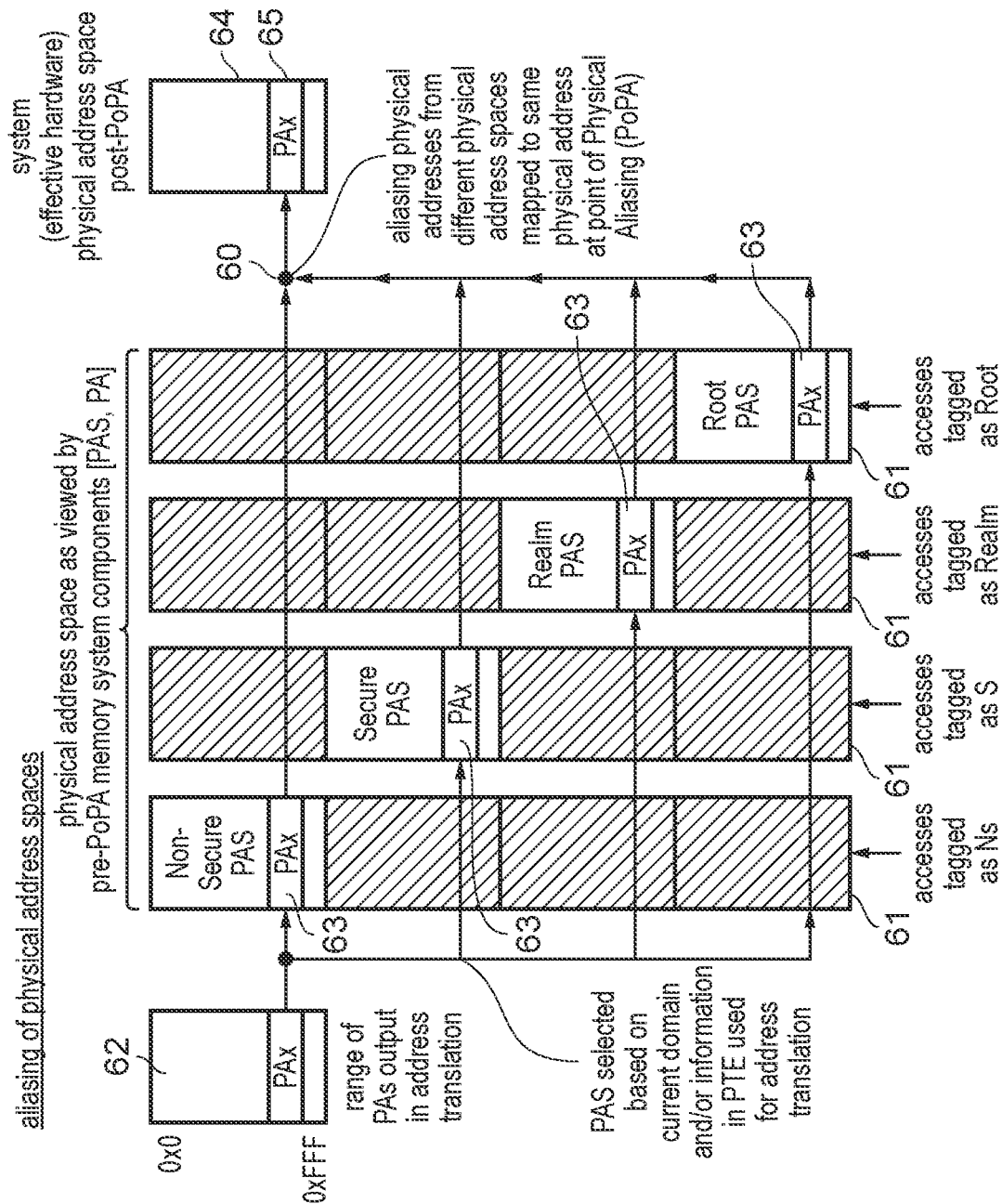
FIG. 5 schematically illustrates aliasing of a number of physical address spaces onto a system physical address space identifying locations in the memory system.

FIG. 5 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 316, the physical address has a value within a certain numeric range 62 supported by the system, which is the same regardless of which physical address space is selected. However, in addition to the generation of the physical address, the address translation circuitry 316 may also select a particular physical address space (PAS) based on the current domain 14 and/or information in the page table entry used to derive the physical address. Alternatively, instead of the address translation circuitry 316 performing the selection of the PAS, the address translation circuitry (e.g. MMU) could output the physical address and the information derived from the page table entry (PTE) which is used for selection of the PAS, and then this information could be used by the PAS filter 320 to select the PAS.

The selection of PAS for a given memory access request may be restricted depending on the current domain in which the processing circuitry 310 is operating when issuing the memory access request, according to rules defined in the following table:

| Current Domain | Non-Secure PAS | Secure PAS | Realm PAS | Root PAS |
|---|---|---|---|---|
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 320 outputs a memory access request to the system fabric (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS ID is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

The system may include more than one PoPA 60 (e.g. different PoPAs may be implemented on different paths by which memory access requests may be routed to different subsets of recipient memory system components). At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS ID may be stripped out from the addresses, and for the downstream components the addresses may simply be identified using the physical address value, without specifying the PAS. Alternatively, for some cases where some completer-side filtering of memory access request is desired, the PAS ID could still be provided downstream of the PoPA 60, but may not be interpreted as part of the address so that the same physical addresses appearing in different physical address spaces 60 would be interpreted downstream of the PoPA as referring to the same memory system location, but the supplied PAS ID can still be used for performing any completer-side security checks.

Figure 6:
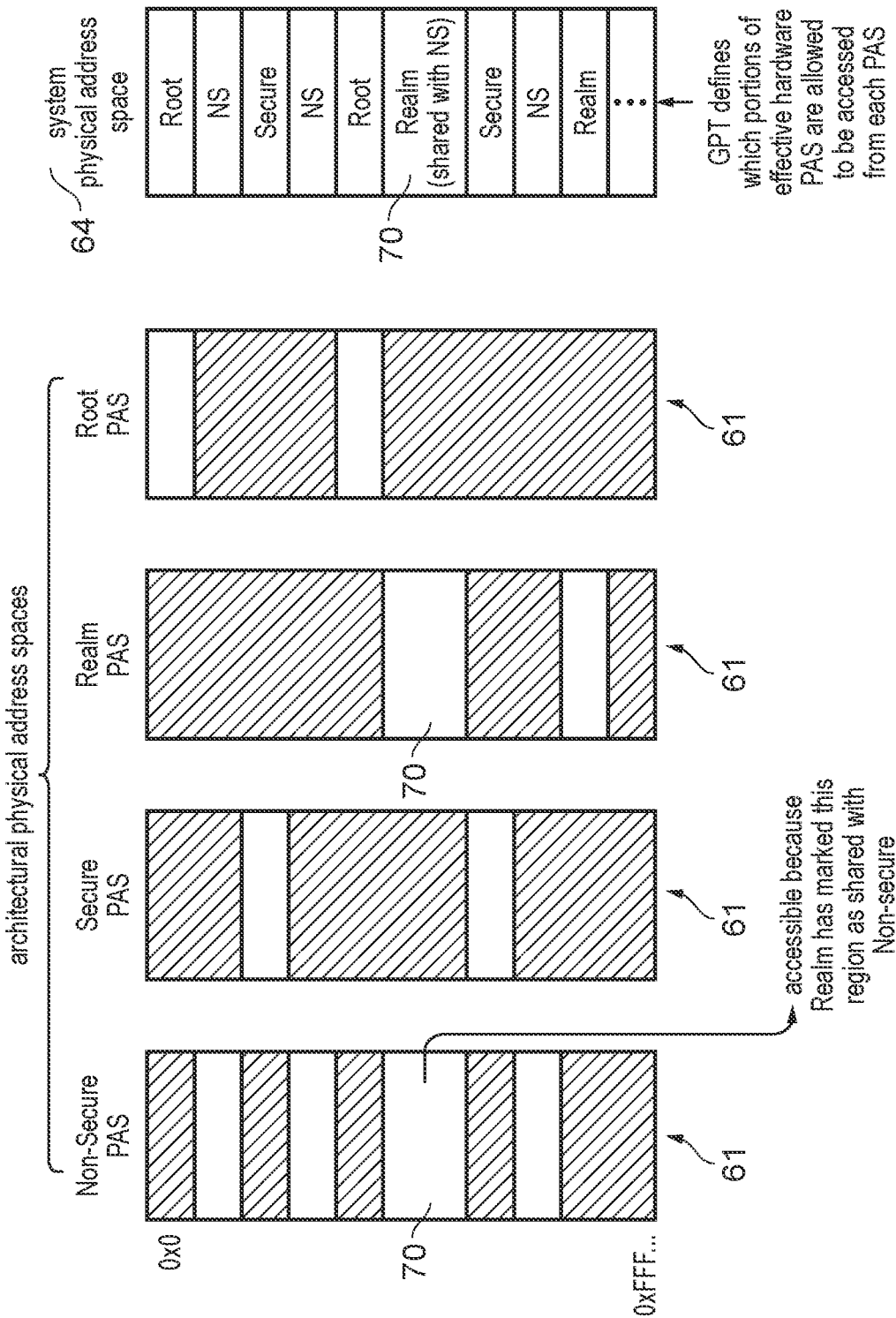
FIG. 6 illustrates an example of partitioning the effective hardware physical address space so that different architectural physical address spaces have access to respective portions of the system physical address space.

FIG. 6 illustrates how the system physical address space 64 can be divided, using the granule protection table 321, into chunks allocated for access within a particular architectural physical address space 61. The granule protection table (GPT) 321 defines which portions of the system physical address space 65 are allowed to be accessed from each architectural physical address space 61. For example the GPT 321 may comprise a number of entries each corresponding to a granule of physical addresses of a certain size (e.g. a 4K page, or a different sized granule) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables 317 the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT 321, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 6 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 86 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 321 to indicate that region 70 is to be shared with the non-secure domain 86, and this may make region 70 also be accessible from the non-secure PAS as shown on the left hand side of FIG. 6, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS ID of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

Issuing of Memory Access Requests

Figure 7:
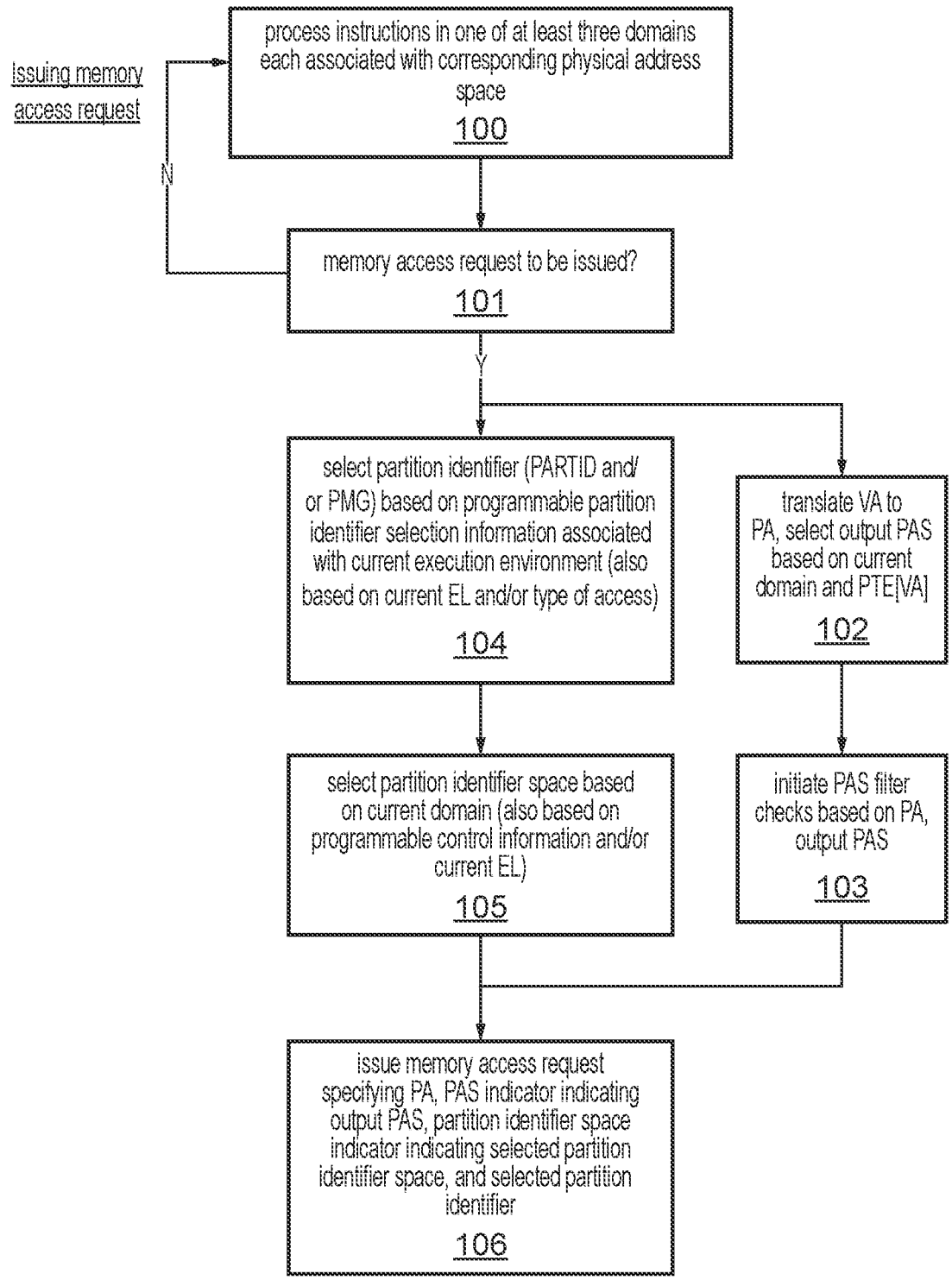
FIG. 7 is a flow diagram illustrating a method of controlling issuing of a memory access request.

FIG. 7 is a flow diagram illustrating steps performed when issuing a memory access request from the processing element 6. At step 100, the processing circuitry 310 processes instructions in one of at least three domains each associated with a corresponding physical address space. At step 101 the processing circuitry determines whether a memory access request is to be issued. The memory access request could be a data access request triggered by execution of a load/store instruction or could be an instruction fetch access request which is caused by the instruction fetch stage 300 issuing a fetch request to fetch an instruction from memory or an instruction cache (or by a prefetcher issuing a prefetch request to prefetch an instruction into the instruction cache ahead of the time when the instruction is actually required by the instruction fetch stage 300). If no memory access request is currently to be issued, then processing continues at step 100.

When a memory access request is to be issued then at step 102 the MMU 316 translates a virtual address specified for the memory access into a physical address, and physical address selection circuitry (e.g. the MMU 316 or the PAS filter 320) selects an output PAS based on the current domain 314 and information specified in a page table entry from page tables 317 that corresponds to the virtual address of the memory access.

Figure 8:
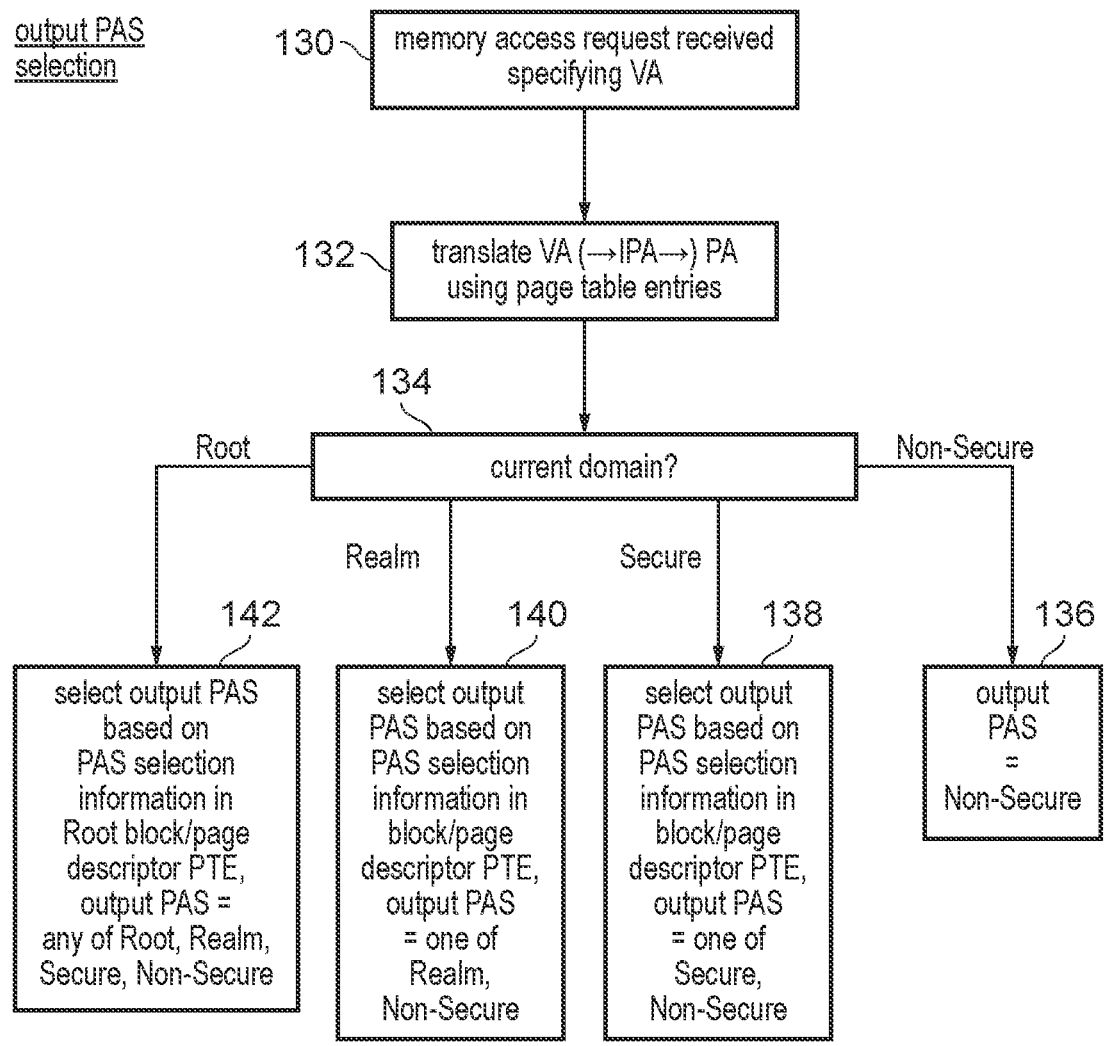
FIG. 8 is a flow diagram showing selecting a physical address space for a given memory access request.

FIG. 8 illustrates step 102 of FIG. 7 in more detail. At step 130 of FIG. 8, the processing circuitry 310 issues a memory access request specifying a given virtual address (VA) as a target VA. At step 132 the address translation circuitry 316 looks up any page table entries (or cached information derived from such page table entries (PTEs)) in its TLB 318. If any required page table information is not available, address translation circuitry 316 initiates a page table walk to memory to fetch the required PTEs (potentially requiring a series of memory accesses to step through respective levels of the page table structure and/or multiple stages of address translation for obtaining mappings from a VA to an intermediate address (IPA) and then from an IPA to a PA). Note that any memory access requests issued by the address translation circuitry 16 in the page table walk operations may themselves be subject to address translation and PAS filtering, so the request received at step 130 could be a memory access request issued to request a page table entry from memory. Once the relevant page table information has been identified, the virtual address is translated into a physical address (possibly in two stages via an IPA). At step 134 the address translation circuitry 316 or the PAS filter 320 determines which domain is the current domain (if the current exception level 315 is EL3, then the current domain is the root domain, and if the current exception level 315 is EL2, EL1, or EL0, then the current domain is one of the Non-Secure, Secure and Realm domains as indicated by current domain indication 314).

If the current domain is the non-secure domain then at step 136 the output PAS selected for this memory access request is the non-secure PAS.

If the current domain is the secure domain, then at step 138 the output PAS is selected based on PAS selection information included in a PTE which provided the physical address, where the output PAS will be selected as either secure PAS or non-secure PAS.

If the current domain is the realm domain, then at step 140 the output PAS is selected based on the PAS selection information included in the PTE from which the physical address was derived, and in this case the output PAS is selected as either the realm PAS or the non-secure PAS.

If at step 134 the current domain is determined to be the root domain, then at step 142 the output PAS is selected based on PAS selection information in the PTE 114 from which the physical address was derived. In this case the output PAS is selected as any of the physical address spaces associated with the root, realm, secure and non-secure domains.

While FIG. 8 describes selection of the PAS based on information defined in the PTE of the page tables 317, another approach could be to provide a separate data structure, independent of the page tables 317, which specifies the PAS to use for each VA. However, in practice some space may be available in PTEs to specify PAS selection information and by combining the PAS selection information with page table information this avoids the need to look up a second structure in addition to the TLB 318 or page tables 317, which helps to save power and reduce circuit area.

Figure 9:
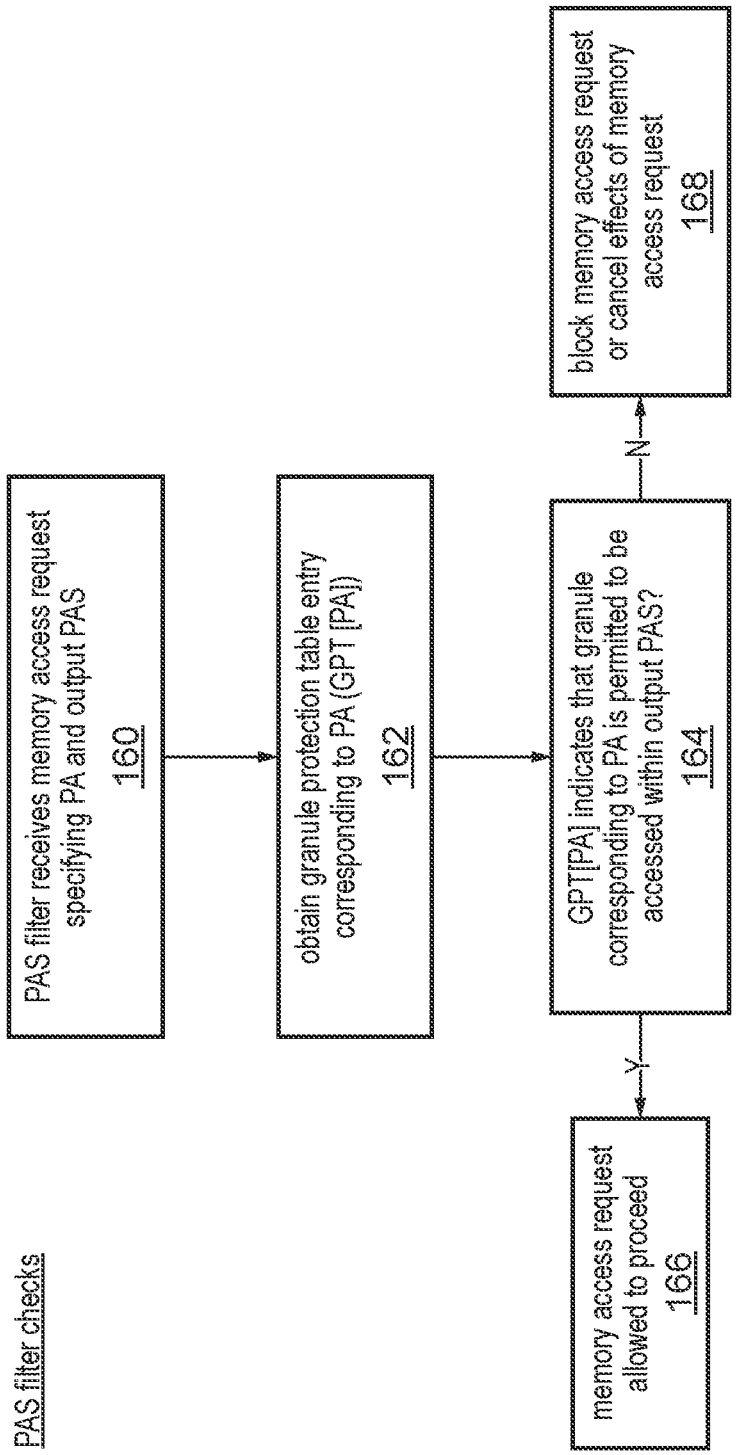
FIG. 9 is a flow diagram showing a physical address space filter check based on information specified in a granule protection table entry corresponding to the accessed physical address.

Returning to FIG. 7, once the output PAS is available, then at step 103 the PAS filter 320 initiates PAS filter checks based on the physical address (PA) and the output PAS selected at step 102. Step 103 is shown in more detail in FIG. 9. At step 160 of FIG. 9, the PAS filter 320 receives the memory access request specifying the PA and the output PAS and at step 162 the PAS filter 320 obtains a granule protection table entry corresponding to the physical address of the memory access from the granule protection table 321 (the GPT entry can be obtained from the GPT cache 322 if the PA hits in the GPT cache 322, or otherwise can be obtained by performing an access to the GPT 321 in memory). At step 164 the PAS filter 320 determines whether the obtained granule protection table entry GPT[PA] corresponding to the target PA indicates that the granule of address space corresponding to the target PA is permitted to be accessed within the output PAS selected at step 102. If so then at step 166 the memory access is allowed to proceed. If the GPT entry corresponding to the specific physical address indicates that the granule corresponding to the physical address is not permitted to be accessed within the output PAS that was selected at step 102 then at step 168 either the memory access request is blocked and prevented from being issued to the cache, interconnect or other memory system component, or in systems which allow the memory access request to be issued speculatively before the checks made by the PAS filter is complete then the PAS filter may take actions to cancel effects of the memory access request. For example the PAS filter may issue control signals which ensure that any changes in state in memory caused by the memory access request are reversed or which ensure that any state returned from memory in response to the memory access request is not used to update registers or otherwise made accessible to software.

The format of the information included within the GPT entry to specify whether a given granule may be permitted to be accessed within a given output PAS may vary from implementation to implementation. Some implementations may support the GPT entry only permitting one particular PAS to be used for a given PA and in that case a check can simply be whether the output PAS matches the allowed PAS specified in the GPT entry accessed at step 162. Other examples may support multiple allowed output PASs for the same physical address and in this case the check may be whether the output PAS is any of the one or more allowed PASs that are specified by the GPT entry for the PA.

Returning to FIG. 7, meanwhile in response to the issuing of the memory access request 101, at step 104 the partition ID selection circuitry 332 selects a partition ID (e.g. PARTID and/or PMG as discussed later in more detail) based on programmable partition ID selection information associated with a current execution environment. For example the partition ID selection information may obtained from the MPAM control registers 330. Each software execution environment may be associated with certain set of MPAM state stored in the MPAM control registers 330, which may be part of that software execution environment's context information which is saved/restored when context switching between execution environments. Hence, on switching from one software execution environment to another, the context associated with the incoming software execution environment may be written to registers, including updating the MPAM control registers 330 to specify the MPAM state associated with the incoming software execution environment. The selection of the partition ID may also be based on the current exception level 315 and/or the type of access being performed (e.g. whether the access is an instruction fetch access or a data access). The selection of the partition ID is shown in more detail in FIGS. 13A and 13B described below.

Also, at step 105 the partition ID space selection circuitry 334 selects a partition ID space based on the current domain 340 (and optionally also based on programmable control information which may be specified within the MPAM control registers 330, and/or on the current exception level 350). The selection of the partition ID space is shown in more detail in FIGS. 14 and 15 described further below. While FIG. 7 shows steps 104 and 105 being performed in parallel with steps 102 and 103, in other examples these could be done sequentially. Also, while step 105 is shown as being performed sequentially after step 104, in other examples step 105 could occur before step 104 or steps 104 and 105 could occur in parallel.

At step 106 the memory access request is issued to the memory system (e.g. to a cache, interconnect or other memory system component) specifying the physical address obtained by the MMU 316 at step 102, the PAS indicator indicating the output PAS selected at step 102, a partition ID space indicator (MPAM_SP) indicating the selected partition ID space selected at step 105 and one or more selected partition IDs selected at step 104. The partition ID space indicator MPAM_SP is a multi-bit value which can indicate one of at least three different partition identified spaces corresponding to respective domains in which the processing circuitry can execute. In the example such as shown in FIG. 4 which supports four different domains (non-secure, secure, realm and root), MPAM_SP may distinguish between four different partition ID spaces, each corresponding to one of those domains. For example, MPAM_SP may have a two-bit encoding as follows (of course, other encodings are also possible):

Non-secure partition ID space: 0b01;
Secure partition ID space: 0b00;
Realm partition ID space 0b11;
Root partition ID space 0b10.

Selection of Partition IDs and Partition ID Space

Figure 10:
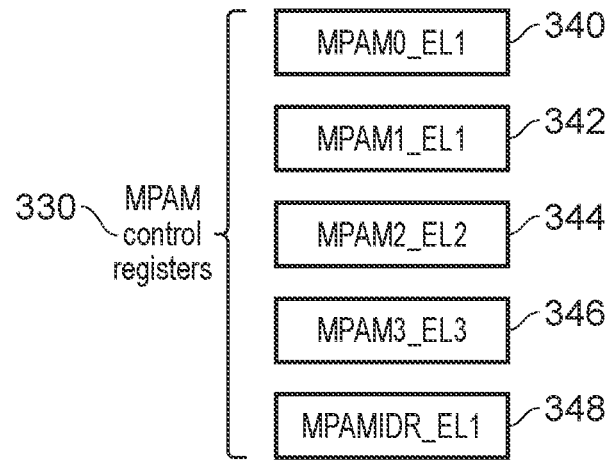
FIG. 10 illustrates an example of control registers for controlling selection of a partition ID and a partition ID space for a memory access request.

FIG. 10 shows an example of the MPAM control registers 330 shown in FIG. 3. The MPAM control registers 330 include a number of partition ID registers MPAMi_ELj 340, 342, 344, 346, where i indicates the exception level for which that register is used to provides the partition IDs and j indicates the least privileged exception level which is able to update the information in that register. Hence, MPAM0_EL1 340 provides partition IDs for use at exception level EL0 and is updatable by code operating at exception level EL1 or higher.

Figure 11:
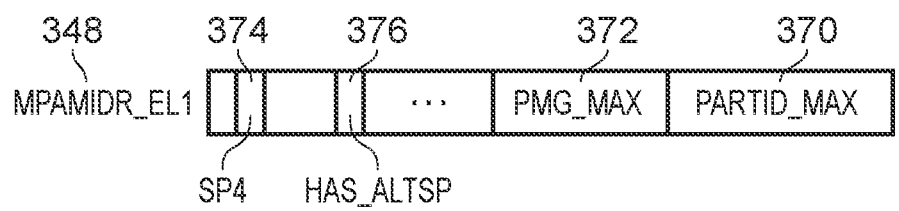
FIG. 11 shows an example of a discovery register for providing discovery information indicating features implemented in the processing system.

The MPAM control registers 330 also include a discovery register MPAMIDR_EL1 348, which is shown in more detail in FIG. 11 and is used for providing information about the hardware capability of the processor implementation, so that software can discover which features are implemented on the hardware. As shown in FIG. 11, the discovery register 348 may include partition ID maximum values 370, 372 indicating the maximum value permitted for resource control partition ID (PARTID) and performance monitoring group (PMG) fields of the partition ID registers 340, 342, 344, 346. This allows different hardware implementations to support different numbers of bits in these IDs and software can read the maximum fields 370, 372 of the discovery register to discover the maximum partition ID value supported by the hardware.

The discovery register 348 also includes a field SP4 374 for indicating whether the hardware implementation supports 4 partition ID spaces corresponding to the non-secure, secure, realm and root states as shown in FIG. 4 above. Not all hardware implementations may support the 4 partition ID spaces and so the 4-space support field 374 can be useful for software to identify whether it can use the additional partition ID spaces. In an implementation which has the partition ID space selection circuitry 334 supporting 4 partition ID spaces, the SP4 field 374 may be set to 1. The SP4 field 374 may be at a bit of the discovery register 348 which would be set to 0 in legacy devices not supporting 4 partition ID spaces.

Also, the discovery register includes an alternative partition ID space support indicating field 376 which indicates whether the hardware implementation supports provision of an alternative partition ID space as discussed further below. In implementations which do not support provision of an alternative partition ID space, each domain is restricted to using its primary partition ID space field 376 would be set to 0 (again the field 376 may be at a bit of the discovery register which would be set to 0 in legacy devices). In an implementation which supports provision of an alternative partition ID space, the HAS_ALTSP field 376 is set to 1.

Figure 12:
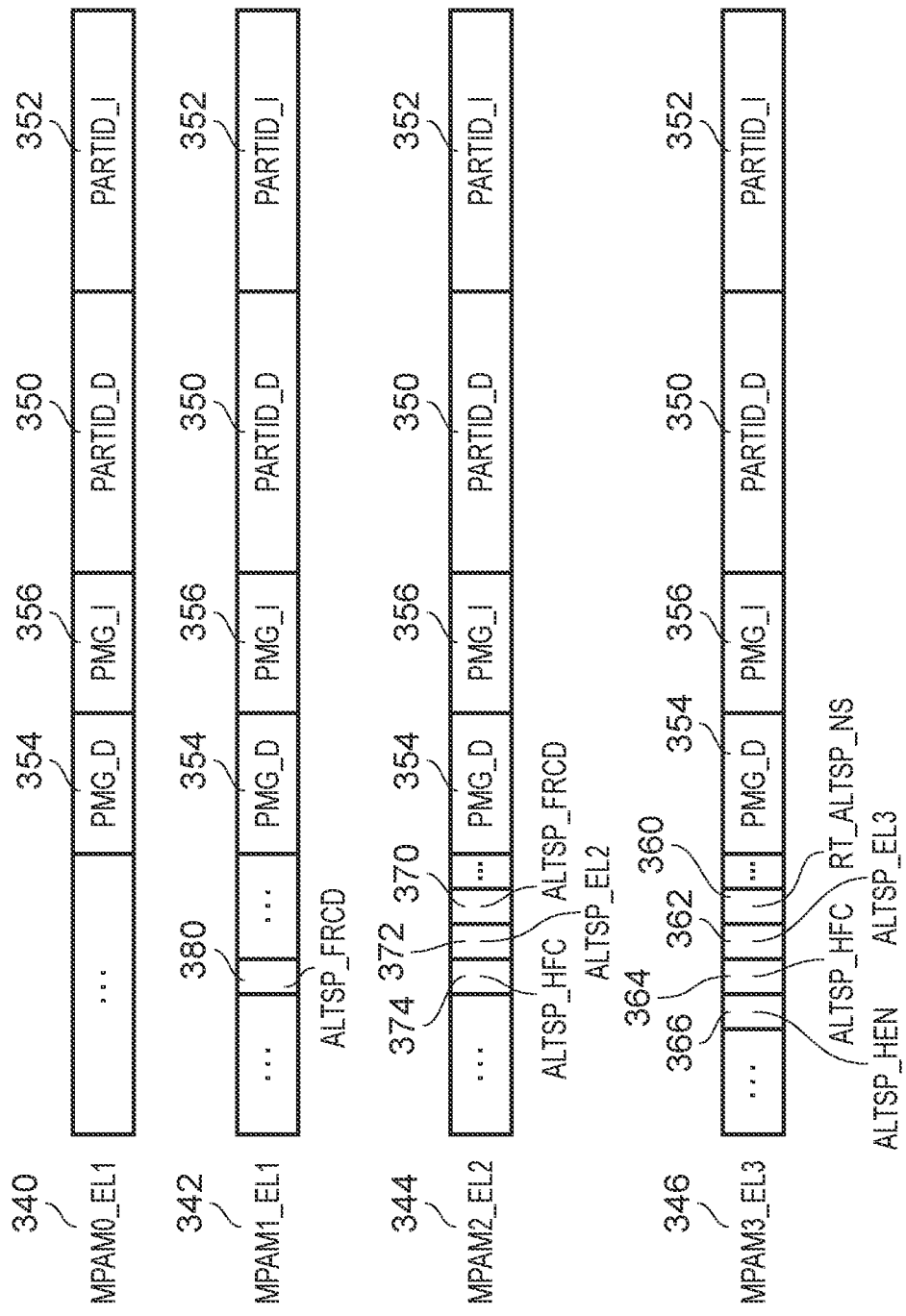
FIG. 12 shows in more detail some of the control registers shown in FIG. 10.

FIG. 12 shows the partition ID registers 340, 342, 344, 346 in more detail. These registers include information for selecting the partition ID to be appended to a memory access request when sent to the memory system and for selecting the partition ID space to be indicated for the memory access request. The state in partition ID registers 340, 342, 344, 346 can be regarded as part of the context information associated with a given software execution environment executing on the processing circuitry. When a context switch occurs, the registers 340, 342, 344, 346 are updated with the context information associated with the incoming software execution environment.

Each partition ID register 340-346 includes a number of partition ID fields 350, 352, 354, 356 for providing partition IDs to use for software executed at the corresponding exception level. In this example there are 4 fields including a data (resource partitioning) partition ID (PARTID_D) field 350, an instruction (resource partitioning) partition ID (PARTID_I) field 352, a data performance monitoring group ID (PMG_D) field 354 and an instruction performance monitoring group ID (PMG_I) field 356.

The fields 350, 354 are used for data memory accesses and the fields 352, 356 are used for instruction fetch memory accesses.

The fields 350, 352 provide a resource partitioning partition ID for use in data accesses and instruction fetches respectively. The memory system component can use the partition ID selected based on the value in one of the resource partitioning partition ID fields 350, 352 to control allocation of resources such as cache capacity or memory bus bandwidth or to manage contention between different requests (for example by selecting request priority based on the partition ID).

The performance monitoring group fields 354, 356 provide an ID used to control whether to update performance monitoring data based on the performance monitoring group ID. In some examples the performance monitoring group ID in fields 354, 356 can be regarded as a standalone ID, separate from the resource control partition ID fields 350, 352. However, in other examples the performance monitoring group ID 354, 356 may be some additional bits which can be used in conjunction with the resource control partition ID 350, 352, so that in that case the performance monitoring group ID value used by the memory system component to control performance monitoring may be a concatenation of the selected partition ID and the selected performance monitoring group ID, rather than regarding the value in field 354, 356 as an independent ID. For example, the PMG fields 354, 356 may be regarded as a prefix or suffix to the corresponding one of the PARTID fields. Regardless of whether the PMG fields 354, 356 are interpreted independently of the PARTID values or are read in combination with the PARTID values, by defining a performance monitoring group ID 354, 356, this allows different subsets of requests which share the same resource partitioning partition ID to be distinguished for the purpose of performance monitoring.

It will be appreciated that it is not essential to provide separate partition IDs for resource partitioning (using fields 350, 352) and performance monitoring control (using fields 354, 356). In other examples the same ID could be used for both purposes, or some implementations may only support one of partitioning of resource allocation and partitioning of performance monitoring control but not both and so may not provide both types of fields.

Also, it is not essential for separate instruction and data partition IDs to be supported and other examples could provide a common ID for both purposes. However, It can be useful to allow separate partition IDs to be defined for the data and instruction accesses for the same software execution environment, so that different resource control parameters can be used for the corresponding instruction and data accesses. An alternative approach would be to have a single partition ID associated with a software execution environment as a whole, but to append an additional bit of 0 or 1 depending on whether the access is for instructions or data, and this would allow the memory system component to select different control parameters for the instruction and data accesses respectively. However, for a given number of sets of control parameters selected based on the partition ID, this approach would mean that there would have to be a 50-50 split of the partition ID space between data and instructions. In practice, it may often be desirable to have more data partitions than instruction partitions, because it can be relatively common for multiple software execution environments to use the same code but execute with different data inputs, and so it can be particularly useful to be able to share a single instruction partition ID among multiple software execution environments while allowing each of those environments to use different data partitions. The approach of appending a 0 or 1 bit to indicate instruction or data accesses would in that circumstance require multiple sets of identical configuration information to be defined at the memory system component for each separate instance of the common code. In contrast, by providing separate instruction and data partition fields in the partition ID register 340-346, where the instruction and data partition IDs are selected from a common ID space, it is possible to reuse the same partition ID between different software execution environments and to partition the partition ID space between data and instructions as required without constraining this to a fifty-fifty split. Even though some additional storage capacity may be required for twice as many partition ID fields in each partition ID register 340-346, this approach can save resource at the memory system component since by sharing one partition between the instruction accesses of multiple execution environments, fewer sets of control parameters (and hence less storage) are required at the memory system component.

Figure 13A:
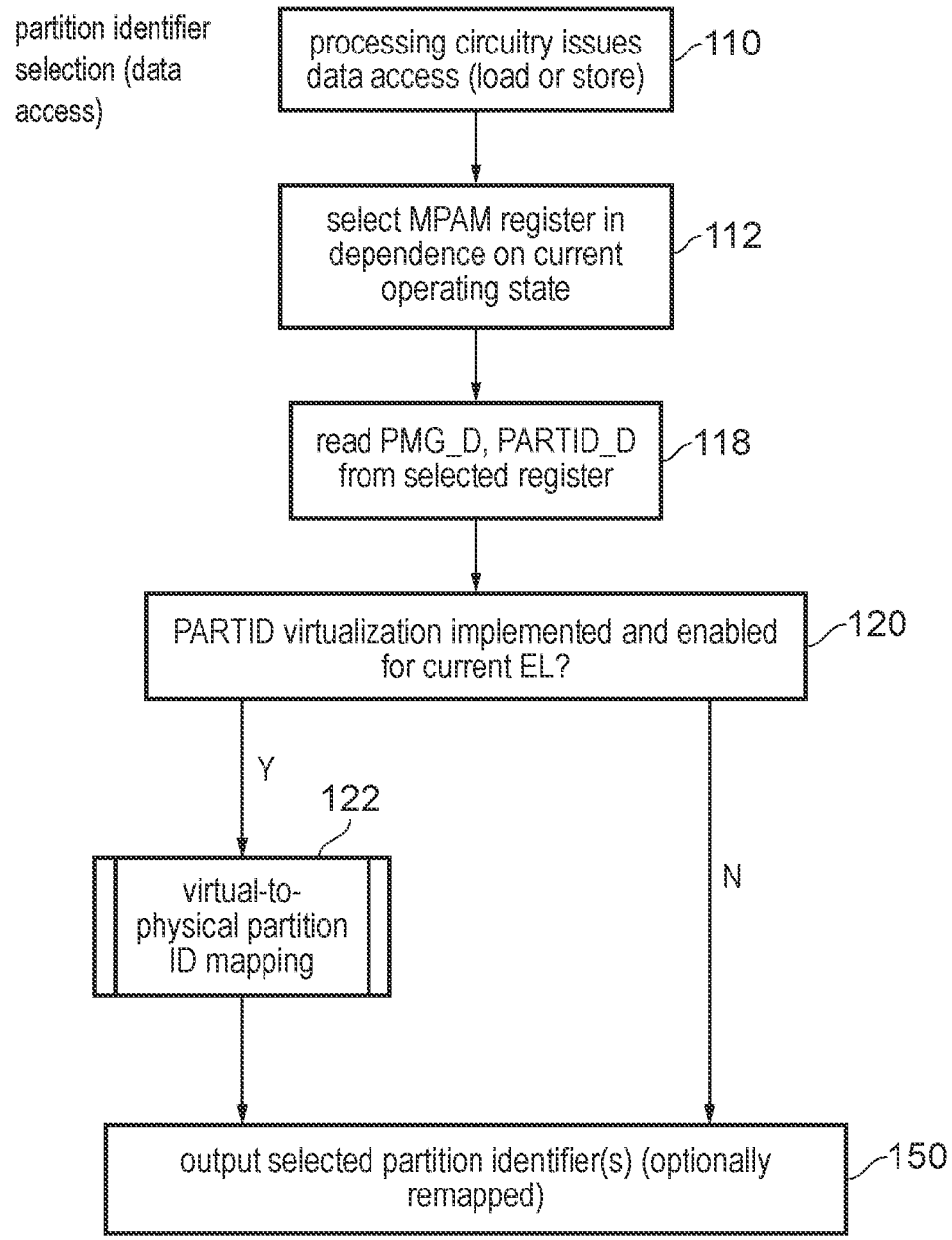
FIGS. 13A and 13B illustrate partition ID selection for data accesses and instruction fetch accesses respectively.

FIG. 13A illustrates a method of controlling selection of the partition ID to be specified for a memory access request. The approach shown in FIG. 13A can be used for data access memory transactions. At step 110 the processing circuitry 310 issues a data access (load/store) memory access request, for example in response to a load/store instruction executed by execution units 304. At step 112 the partition ID selection circuitry 332 reads one of the partition ID registers 340, 342, 344, 346 selected in dependence on the current operating state of the processor. For example, the partition ID selection circuitry 332 may select the one of the partition ID registers 340, 342, 344, 346 which corresponds to the current exception level 315 (selecting register 340 if the current exception level is EL0, register 342 if the current exception level is EL1, register 344 if the current exception level is EL2 and register 346 if the current exception level is EL3). In some implementations it may be possible to define further control state information within control registers that may vary which partition ID register is selected for a particular exception level, departing from the default of using the register 340-346 that is associated with the current exception level. For example, it is possible to set a parameter which may force the partition IDs in register MPAM1_EL1 342 to be used when the current exception level is EL0, which could be useful in cases where an operating system wishes the applications it is managing to use the same partition ID as the operating system itself as defined in MPAM1_EL1 342, so that this can avoid the operating system having to set partition ID values for MPAM0_EL1 340. Hence, in some systems some control states may also influence the selection of the MPAM register other than the current exception level, but this is not essential.

At step 118, as the current memory access request is a data access request, the PMG_D and PARTID_D fields 354, 350 are read from the one of the registers 340, 342, 344, 346 that was selected at step 112. At step 120 the partition ID selection circuitry 332 determines whether virtualisation of partition IDs is implemented and enabled for the partition IDs read from the selected register in the current operating state. For processes executing as EL2 or EL3 there is no need to perform virtualisation. For software execution environments at EL0 or EL1, if virtualisation is supported by the hardware, whether virtualisation is currently enabled may depend on information specified in a control register (e.g. controlled by a hypervisor executing at EL2). When virtualisation of partition IDs is both implemented in the hardware and currently enabled for the current exception level then at step 122 the partition ID selection circuitry 332 performs virtual-to-physical partition ID mapping to map the virtual partition ID values read at step 118 to corresponding physical partition ID values based on mapping information set for the current execution environment. For example, a hypervisor could maintain a partition ID remapping table which can be used to implement the remapping of partition IDs. This can be useful to allow different guest operating systems which may have defined conflicting partition ID values to coexist on the same system without conflict, so that the conflicting virtual partition ID values can be remapped to different physical partition ID values, and the respective operating systems' access requests can be distinguished at a memory system component to perform separate resource allocation control or performance monitoring. The mapping table could be implemented in different ways, for example a set of partition ID remapping registers could be provided to specify the physical partition ID values corresponding to different values of virtual partition ID read from registers 340, 342, 344, 346, or alternatively a remapping structure stored in memory could be used to provide the mapping table. If virtualisation is implemented and enabled and the partition IDs are remapped to physical partition IDs at step 122 then at step 150 the remapped partition IDs are output for transmission to the cache, interconnect or other memory system component along with the memory access request (once that request has undergone any necessary address translation and PAS filtering). If virtual-to-physical partition ID mapping is not implemented on the hardware device or is not currently enabled then step 122 is omitted and at step 150 the partition IDs read from the selected register 340-346 are simply output in their original form without remapping.

Figure 13B:
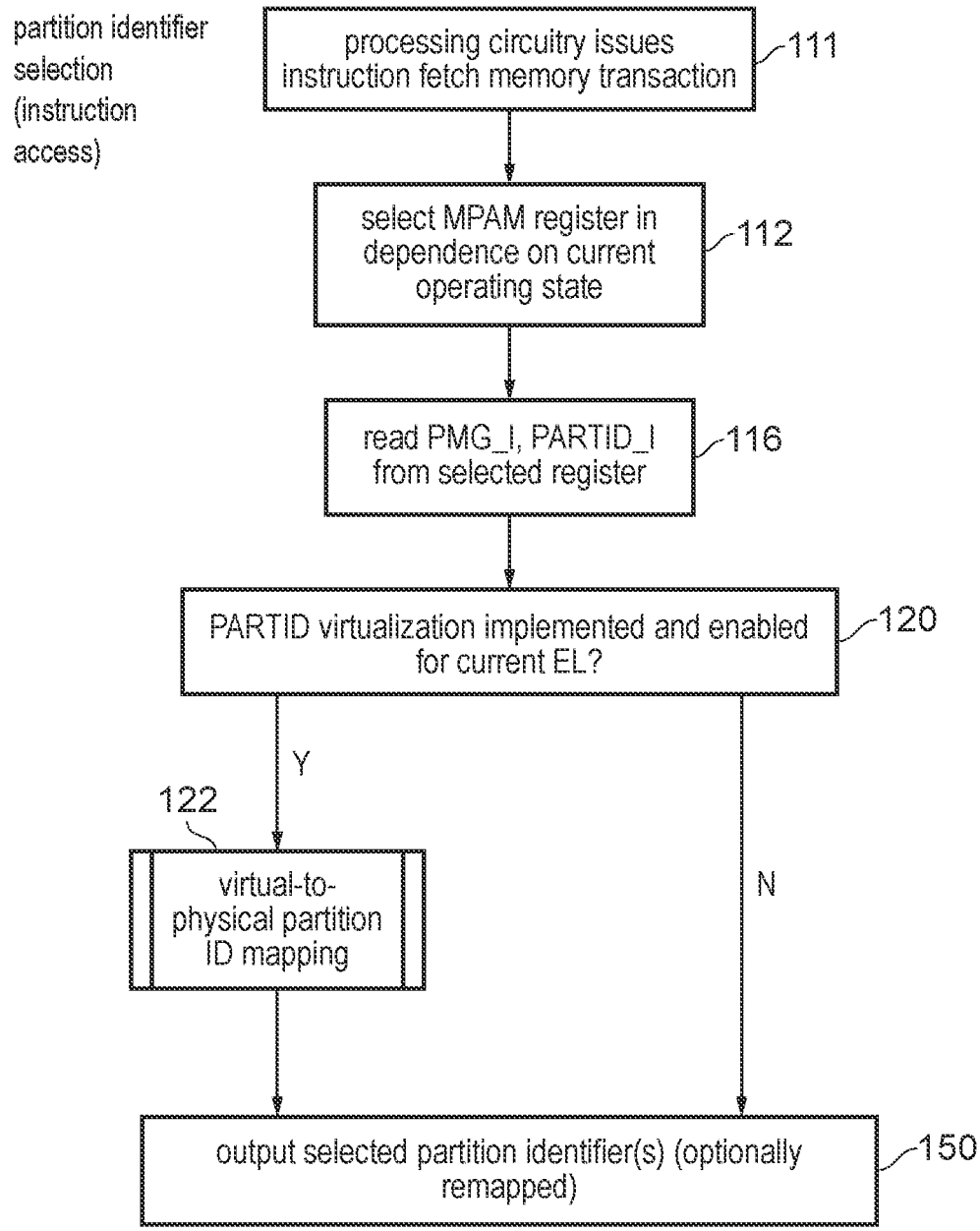

FIG. 13B illustrates a method of selecting partition IDs for instruction fetch access memory transactions. At step 111 of FIG. 13*b*, the processing circuitry 310 issues an instruction fetch memory access request, to request fetching of an instruction for a given address. The instruction fetch request could be made by the fetch circuitry 300 when actually needing the instruction to be fetched for execution, or some implementations may have pre-fetch circuitry to pre-fetch instructions into an instruction cache ahead of the time when they are actually needed for execution and so the pre-fetch circuitry could also generate instruction fetch memory access requests. In response to issuing of the instruction fetch memory access request, steps 112-150 of FIG. 13*b* are the same as in FIG. 13*a* for a data access request, except that step 118 of FIG. 13*a* is replaced with step 116 in FIG. 13*b* where the PMG_I and PARTID_I fields 356, 352 are read from the selected partition ID register instead of the PMG_D and PARTID_D fields 354, 350. Steps 120, 122, 150 are the same except that they are using the instruction partition ID values from fields 356, 352 instead of the data partition ID values from fields 354, 350.

Returning to FIG. 12, some of the partition ID registers also include control state information for controlling selection of the partition ID space to be used for a given memory access request. Each of the domains supported by the processing circuitry has a corresponding primary partition ID space associated with that domain. The control state in registers 344, 346 can be used to select whether to use a primary partition ID space or an alternative partition ID space. This control state information includes:

In MPAM3_EL3 346:
- Root alternative space selection information (RT_ALTSP_NS) 360 used by code at EL3 to select whether the alternative partition ID space for the root domain is the secure partition ID space or the non-secure partition ID space;
- EL3 partition ID space selection information (ALTSP_EL3 362), used to select whether the primary or alternative partition ID space should be used for memory accesses issued at EL3;
- EL3-controlled hierarchical forced space selection information (ALTSP_HFC) 364, providing space selection control information programmable at EL3 to control selection of whether to use the primary or alternative partition ID space for accesses made from EL2, EL1 and EL0, in the case when hierarchical control is disabled using ALTSP_HEN 366;
- Hierarchical control enable information (ALTSP_HEN) 366, controlling whether hierarchical control is enabled or disabled. When hierarchical control is enabled, instructions executed at EL2 are allowed to influence selection between the primary and alternative partition ID spaces for accesses made from EL2, EL1 or EL0. When hierarchical control is disabled, instructions executed at EL2 cannot influence selection between the primary and alternative partition ID spaces for accesses made from EL2, EL1 or EL0, and selection between the primary and alternative partition ID spaces for accesses made from EL2, EL1 or EL0 depends on ALSTP_HFC 364 set by instructions executed at EL3 within register MPAM3_EL3 346;

In MPAM2_EL2 344:
- EL2 hierarchical forced space indicating information (ALTSP_FRCD) which indicates whether the code operating at EL3 has forced selection of the alternative partition ID space for code operating at EL2;
- EL2 partition ID space selection information (ALTSP_EL2) 372 set by code operating at EL2 which controls, in cases where the hierarchical control has been enabled using MPAM3_EL3.ALTSP_HEN 366, whether code operating at EL2 should use the primary or alternative partition ID space;
- EL2-controlled hierarchical forced space selection information (ALTSP_HFC) 374, which is programmable partition ID space selection information set at EL2 which, in cases when hierarchical control is enabled by MPAM3_EL3.ALTSP_HEN 366, specifies whether code operating at EL0 or EL1 should use the primary or alternative partition ID space;

In MPAM1_EL1 342:
- EL1 hierarchical forced space indicating information (ALTSP_FRCD) 380 which indicates to code operating at EL1 whether selection of the alternative partition ID space has been forced on the code operating at EL1 by code operating at EL3 or EL2.

A summary of the options supported by these partition ID selection controls is provided below:

When the alternative partition ID space feature (ALTSP) is supported by the hardware as indicated by field 376 in discovery register, an alternative partition ID space is supported for each of the security states (domains) other than Non-secure (for which the Non-secure partition ID space is used regardless of whether the controls in registers 344, 346 indicate that the primary/alternative space is selected). Equivalently, the Non-secure security state could still be regarded as having an alternative partition ID space, but its alternative partition ID space is the same as the primary partition ID space. Hence, the primary and alternative partition ID spaces supported for each of the domains are as follows:

| Domain | Primary partition ID space | Secondary partition ID space |
|---|---|---|
| Non-secure | Non-secure partition ID space | Non-secure partition ID space (same as primary) |
| Secure | Secure partition ID space | Non-secure partition ID space |
| Realm | Realm partition ID space | Non-secure partition ID space |
| Root | Root partition ID space | Non-secure partition ID space or Secure partition ID space |

The choice of the alternative space for Root is made in MPAM3_EL3 346 in the RT_ALTSP_NS field 360. A 0b1 in this field selects Non-secure partition ID space as the alternative partition ID space for the Root security state. RT_ALTSP_NS of 0b0 selects the Secure partition ID space as the alternative partition ID space for the Root security state.

When executing at EL3, the processing element is in the Root security state. The selection of primary or alternative partition ID space for memory system requests generated in the Root security state is controlled by bits in MPAM3_EL3 346:

- RT_ALTSP_NS 360 sets whether the alternative partition ID space in the Root security state is Non-secure partition ID space or the Secure partition ID space.
- ALTSP_EL3 362 sets whether memory system requests generated from EL3 use the primary partition ID space or the alternative partition ID space.

These two bits combine to give 3 combinations for partition ID space used for accesses from EL3 in the Root state:

| MPAM3_EL3.RT_ALTSP_NS 360 | MPAM3_EL3.ALTSP_EL3 362 | Partition ID space |
|---|---|---|
| X | 0 | Root partition ID space |
| 0 | 1 | Secure partition ID space |
| 1 | 1 | Non-secure partition ID space |

When executing at EL2, EL1 or EL0, the security state may be Secure, Non-secure or Realm security state. The Root software running in EL3 can either permit EL2 to control its own partition ID space and the partition ID space used by EL1 and EL0, or it can force the primary or alternative space to be selected for EL2, EL1 and EL0.

If EL3 has enabled the alternative space controls in MPAM2_EL2 344 (i.e. hierarchical control is indicated as enabled by MPAM3_EL3.ALTSP_HEN 366), EL2 can select whether partition IDs generated at EL2 use the primary or alternative partition ID space via MPAM2_EL2.ALTSP_EL2 370. When EL3 has enabled the alternative space controls in MPAM2_EL2 344, EL2 can also select whether the primary or alternative partition ID space is used by EL1 and EL0. EL3 forces a selection on all lower ELs by clearing MPAM3_EL3.ALTSP_HEN 366 and setting MPAM3_EL3.ALTSP_HFC 364 to force the alternative partition ID space or clearing ALTSP_HFC 364 to force the primary partition ID space on all lower ELs.

The set of combinations for EL2 and for EL1 and EL0 are shown in the table below:

| MPAM3_EL3. ALTSP_HEN 366 | MPAM3_EL3. ALTSP_HFC 364 | MPAM2_EL2. ALTSP_HFC 374 | MPAM2_EL2. ALTSP_EL2 372 | EL2 partition ID space | EL1 and EL0 partition ID space |
|---|---|---|---|---|---|
| 0 | 0 | X | X | Primary | Primary |
| 0 | 1 | X | X | Alternative | Alternative |
| 1 | X | 0 | 0 | Primary | Primary |
| 1 | X | 0 | 1 | Alternative | Primary |
| 1 | X | 1 | 0 | Primary | Alternative |
| 1 | X | 1 | 1 | Alternative | Alternative |

In each of MPAM2_EL2 344 and MPAM1_EL1 342, a field ALTSP_FRCD 370, 380 indicates that the alternative partition ID space has been forced on partition IDs in MPAM2_EL2 and on partition IDs in MPAM1_EL1 and MPAM0_EL1, respectively. Since EL1 and EL0 selection is always identical and EL1 controls partition IDs in MPAM0_EL1, there is no need for a separate indication in MPAM0_EL1 340.

Figure 14:
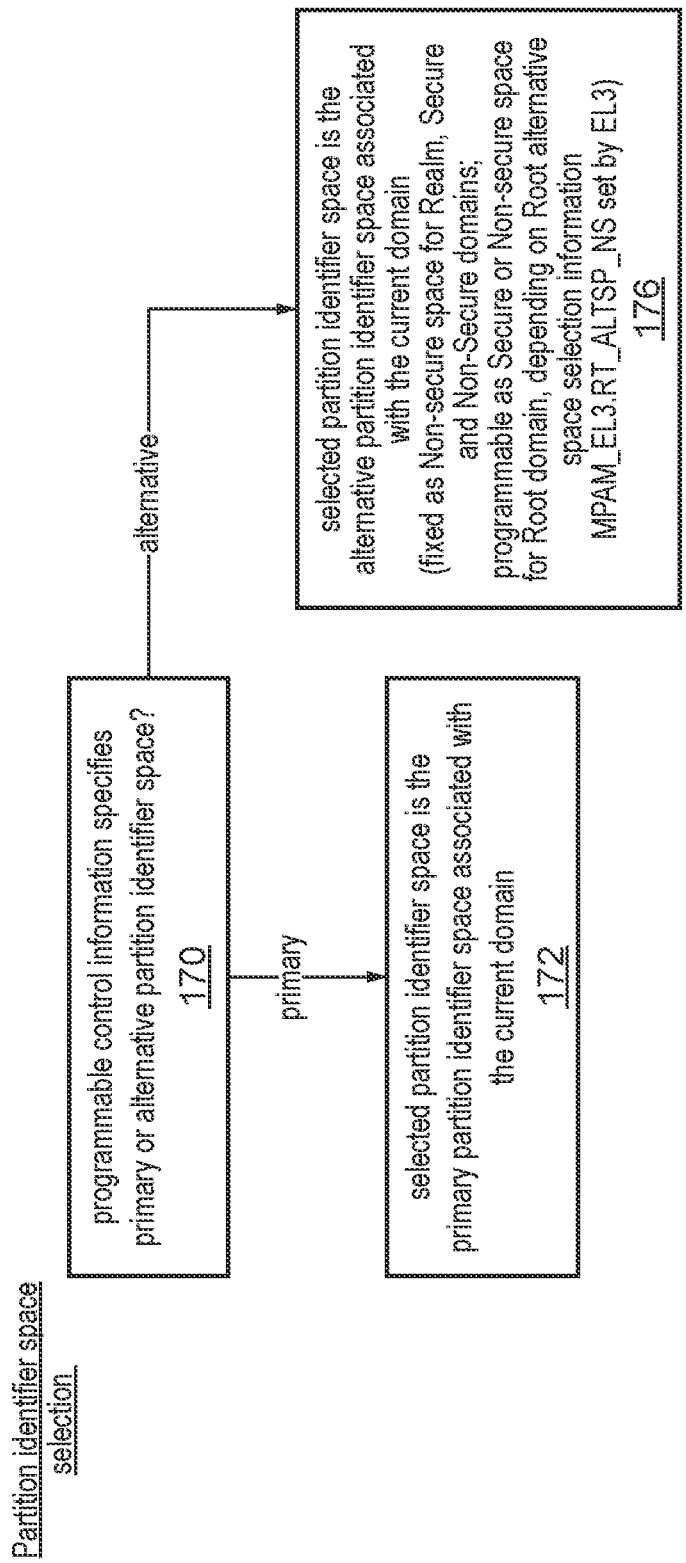
FIG. 14 is a flow diagram illustrating partition ID space selection.

FIG. 14 is a flow diagram illustrating selection of the partition ID space by partition ID space selection circuitry 334. At step 170 the partition ID space selection circuitry 334 determines whether the programmable control information in registers 344, 346 specifies that the primary or alternative partition ID space is to be used. When the primary partition ID space is to be used then at step 172 the selected partition ID space indicated by the partition ID space indicator MPAM_SP for the issued memory access request is the primary partition ID space associated with the current domain. If the alternative partition ID space is to be used then at step 176 the selected partition ID space indicated by MPAM_SP is the alternative partition ID space associated with the current domain, which may be fixed as the non-secure partition ID space when the current domain is the Realm, Secure or Non-secure domain, and may be programmable as either the Secure or Non-secure partition ID space for the root domain, depending on Root alternative space selection information MPAM_EL3.RT_ALTSP_NS 360 which is set within MPAM3_EL3 346 by code operating at EL3.

Figure 15:
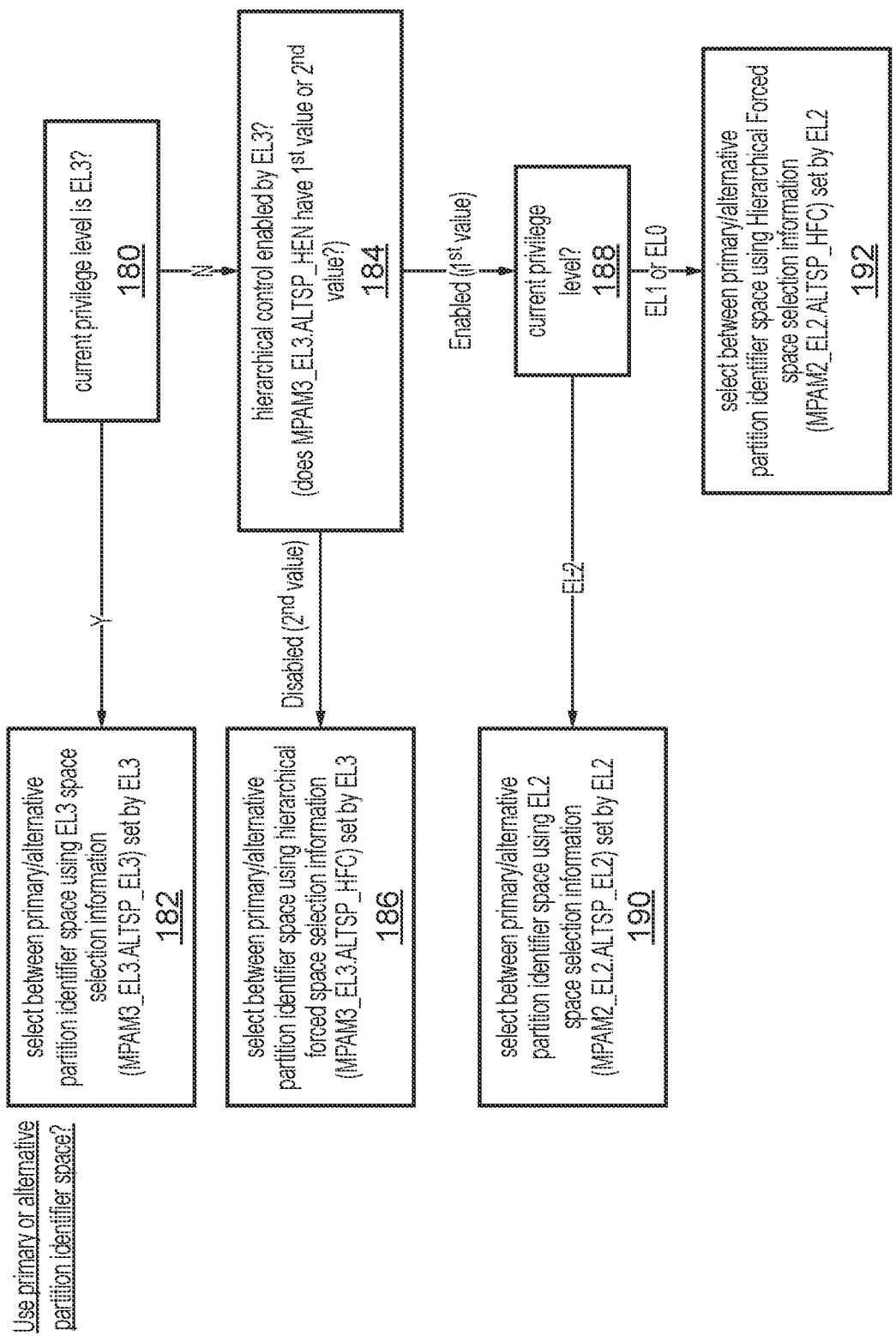
FIG. 15 is a flow diagram illustrating in more detail a step of FIG. 14 for selecting whether to use a primary partition ID space or an alternative partition ID space.

FIG. 15 is a flow diagram showing in more detail criteria for selecting between the primary and alternative partition ID spaces at step 170 of FIG. 14. At step 180 the partition ID space selection circuitry 334 determines whether the current privilege level is EL3 and if so then at step 182 the EL3 space selection information (MPAM3_EL3.ALTSP_EL3 362) set by code operating at EL3 is used to select between the primary and alternative partition ID spaces.

If the current privilege level is EL2, EL1, or EL0 then at step 184 the partition ID space selection circuitry 334 determines whether hierarchical control over the partition ID space selection is enabled by EL3. For example, the circuitry 334 determines whether the hierarchical enable value MPAM3_EL3.ALTSP_HEN 366 has a first value or a second value. If ALTSP_HEN 366 has a first value (e.g. 1) then hierarchical control is enabled and if ALTSP_HEN 366 has a second value (e.g. 0) then hierarchical control is disabled.

If hierarchical control is disabled by the code operating at EL3 then the code operating at EL3 will determine whether the primary/alternative partition ID space should be used for code operating at EL2, EL1 or EL0. Therefore, at step 186 the selection between the primary and alternative partition ID spaces to be used at EL2, EL1 or EL0 is made using the hierarchical forced space selection information MPAM3_EL3.ALTSP_HFC 364 set by the code at EL3. Hence, in this case code operating at EL2 has no influence on whether it or code operating at EL1 or EL0 should use the primary or alternative partition ID space.

If hierarchical control over partition ID space selection is enabled by EL3 (ALTSP_HEN 366 has the first value) then at step 188 the partition ID space selection circuitry 334 determines whether the current privilege level is EL2 or is one of EL1 and EL0. If the current privilege level is EL2 then at step 190 the selection between the primary and alternative partition ID spaces is made using the EL2 space selection information MPAM2_EL2.ALTSP_EL2 372 set by code at EL2 within register 344. On the other hand, if the current privilege level is EL1 or EL0 then at step 192 the selection between the primary and alternative partition ID spaces is made using the hierarchical forced selection information MPAM2_EL2.ALTSP_HFC 374 set in register 344 by code operating at EL2.

It will be appreciated that while the flow diagrams discussed above show steps occurring in a certain order or sequence, other implementations may reorder the steps or perform some of the steps in parallel.

In summary, by using programmable control information within the registers, partition IDs can be defined within one of four partition ID spaces corresponding to the respective domains of operation as discussed above and software has flexibility as to whether they actually need to use all four of the supported partition ID spaces or whether some software may prefer to use the alternative partition ID space to allow sharing of a common partition ID space between software operating in different security states. If software can share a common partition ID space, this can reduce the number of sets of resource control parameters to be defined for memory system components for each combination of partition ID and partition ID space currently in use, which can reduce management overhead for software.

Memory System Component Usage of Partition ID and Partition ID Space

Figure 16:
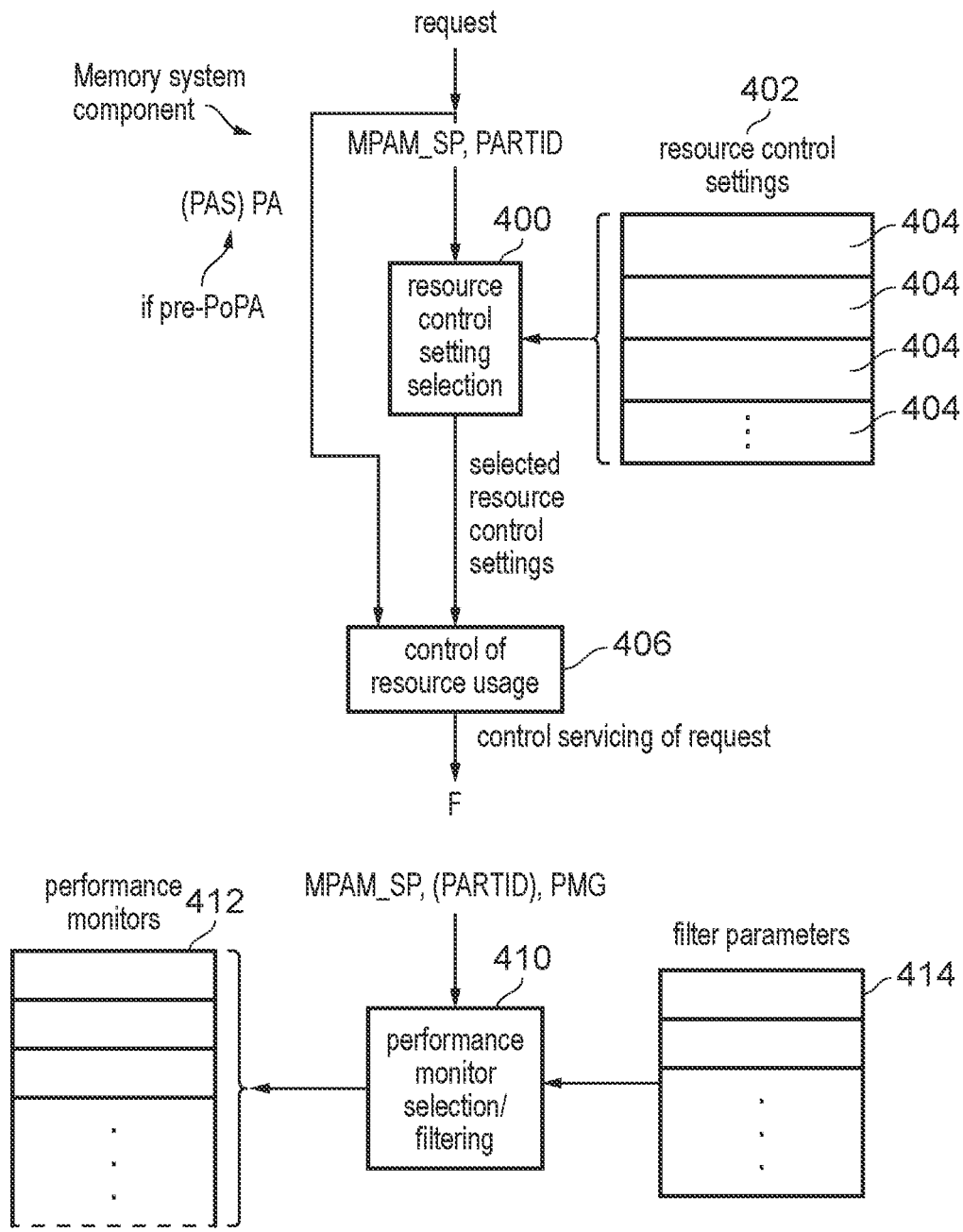
FIG. 16 illustrates portions of a memory system component.

FIG. 16 illustrates an example of circuitry within a memory system component, which could for example be a cache 8, 10, 12, 16, 20, control circuitry within an interconnect 14, 18 or a memory controller 24. A memory access request is received by the memory system component which as discussed above specifies the physical address (PA) of the access, a partition ID space indicator MPAM_SP and one or more partition IDs, e.g. the resource control partition ID (PARTID) and the performance monitoring group ID (PMG). If the memory system component is a pre-PoPA component lying upstream of the point of physical aliasing (PoPA) 60, then the memory access request also specifies a physical address space PAS ID identifying the physical address space of the access. If the memory system component is downstream of the PoPA 60 then the PAS ID may not be provided with the request as the request would already have passed the PoPA where the aliasing [physical addresses in different physical address spaces are de-aliased (for example by stripping out the PAS ID).

The memory system component includes resource control parameter selection circuitry 400 which selects a set of one or more memory system resource control parameters from a resource control setting structure 402, based on the combination of the partition ID space indicator MPAM_SP and the resource control partition ID value (PARTID) supplied with the request. The resource control setting structure 402 includes a number of entries 404 each corresponding to a different combination of the MPAM_SP, PARTID values. Hence, the same partition ID value PARTID occurring in different partition ID spaces may correspond to different sets of resource control parameters 404. The resource control setting structure 402 could be a set of registers implemented in hardware within the memory system component, which can be updated by the processing circuitry 310 issuing a memory access request specifying as its target address a address mapped to one of those registers (in some cases to reduce the number of addresses to be exposed to the memory map, a single register may act as the interface having the memory mapped address to be written to when resource control settings are to be updated, and part of the information specified by a memory access request targeting the interface register could be an entry ID which indicates which resource control setting entry 404 is to be updated, so that it is not necessary to have separate memory mapped addresses for each resource control setting register provided in hardware). Alternatively, the resource control setting structure 402 could a structure maintained within memory at a set of addresses reserved by software for that structure and in that case the hardware of the memory system component could merely have a register identifying the base address of that data structure within the memory address space. Optionally the memory system component could include a resource control setting cache for caching resource control setting entries 404 from that memory-based structure.

In general, regardless of whether the resource control settings 402 are implemented using registers of the hardware system component or a data structure in memory, the resource control parameters 404 corresponding to a given partition ID space may be accessible to software executing on a processing element 6, by issuing a memory access request specifying, in the PAS ID, the physical address space which corresponds to the domain associated with the given partition ID space. Hence, the resource control settings for defining settings for partition IDs in the Non-secure, Secure, Realm and Root partition ID spaces may be accessed using memory access requests specifying physical addresses within the Non-secure, Secure, Realm and Root physical address spaces respectively.

Based on the selected set of resource control parameters 404, resource usage control circuitry 406 controls servicing of the memory access request based on the selected resource control parameters. The way in which the resource control parameters are used to influence servicing of the request may vary depending on the type of memory system component and the features implemented, but in general the parameters may influence the allocation of performance resources to handling of the request or the management of contention for such resources between different requests, but the resource control settings do not affect the functional outcome of the handling of the request, such as a determination of whether the request should be allowed or rejected or a selection of which particular memory system location is accessed in response to the request.

For example, if the memory system component is a cache, the resource control settings 404 may be used to control allocation of cache storage capacity for data or instructions associated with the physical address PA of the request. For example the resource control settings 404 could define a maximum cache capacity allowed to be allocated for data instructions associated with the specified partition ID and partition ID space, with the cache capacity restriction for example defining a maximum fraction of the cache capacity allowed to be used for that combination of partition ID and partition ID space indicator. Another option may be for the resource control settings to specify which individual portions of the cache (e.g. which ways of a set-associative cache) are allowed to be allocated for data or instructions associated with corresponding partition ID and partition ID space. With a portion-based control one software process could be restricted to using a relatively small subset of the ways of the cache while another software execution environment could be allowed to use a larger number of ways so that it is more likely that that other software execution environment sees greater performance when accessing memory. Either way, by providing some resource control settings which can limit the amount of cache capacity used by a given software execution environment, this can reduce the noisy neighbour problem by preventing one software execution environment using up the majority of the cache capacity.

Another example of resource usage control may be for an interconnect or memory controller to control allocation of bandwidth on a bus based on the resource control settings 404 selected for the current request based on the specified partition ID and partition ID space. For example, minimum and/or maximum bandwidths may be defined in the resource control settings which may be used to control how many slots on a bus may be used for requests associated with a particular software execution environment as indicated by the partition ID the partition ID space specified in the memory access request. For example, if bandwidth used recently by a given process drops below its minimum bandwidth indicated in the corresponding set of resource control settings selected for the combination of partition ID and partition ID space, requests specifying that combination of partition ID and partition ID space can be prioritised in future bus arbitration. If the bandwidth used by a given process exceeds the defined maximum bandwidth, the memory access requests specifying the corresponding combination of partition ID and partition ID space may be deprioritised in future bus arbitration decisions, e.g. by being prevented being allocated further bus slots until the bandwidth utilisation drops below the maximum.

Another option can be that memory system components such as a memory controller or interconnect could set a priority for a given memory access request based on the resource control settings, so that a request for one software execution environment can be prioritised ahead of requests for another software execution environment, with the priority being used to manage contention for resource between requests. Hence, there may be a wide variety of ways in which the resource control settings could influence the performance achieved when servicing requests to access memory.

As shown in FIG. 16 the memory system component could also include performance monitor selection and filtering circuitry 410 which controls updating of performance monitor counters 412 in response to memory access requests process by the memory system components, with the criteria for updating the performance monitors 412 being defined in filter parameters 414. Similar to the resource control settings 402, the filter parameters 414 could be defined within registers of the memory system component, or within a memory-based structure (which may optionally be cached). The performance monitors 412 may also be accessed as memory mapped registers or in memory. The partition ID space indicator and the performance monitoring group ID PMG (and, optionally, the resource control partition ID value (PARTID) as well in an implementation where PMG is regarded as a prefix/suffix to be concatenated with PARTID) may be used to select which performance monitor 412 to update and/or whether to update a performance monitor based on a selection of a set of filter parameters 414 corresponding to the combination of MPAM_SP, PMG and optionally PARTID. Hence, different performance monitors 412 can be defined for different combinations of the partition ID and partition ID space indicator, and also different sets of filter parameters can be defined for such combinations. This allows performance can be tracked separately for one software execution environment compared to another and also software executing in different security domains may have different sets of performance monitors associated with them or different sets of filter parameters to define different criteria for performance monitoring. For example the performance monitors 412 could be a set of counters which are incremented in response to memory access requests meeting certain criteria and the filter parameters may define the criteria, such as defining a range of memory addresses for which the performance monitors are to be updated, defining types of memory accesses to be tracked (e.g. loads or stores) or defining types of events to be counted by the performance monitors 412, such as cache misses, total requests, latency of handling requests, etc.

While FIG. 16 shows an example of a memory system component which has both resource control setting selection circuitry 400 and performance monitoring selection and filtering circuitry 410, it is not essential that all memory system components have both of these and some system components may only have one of these. Also, the memory system may include some components which do not support resource partitioning at all and they have neither the resource control setting selection circuitry 400 nor the performance monitoring selection and filtering circuitry 410. Nevertheless, such memory system components not supporting any partitioning may coexist within the same memory system as other memory system components that do support partitioning.

Figure 17:
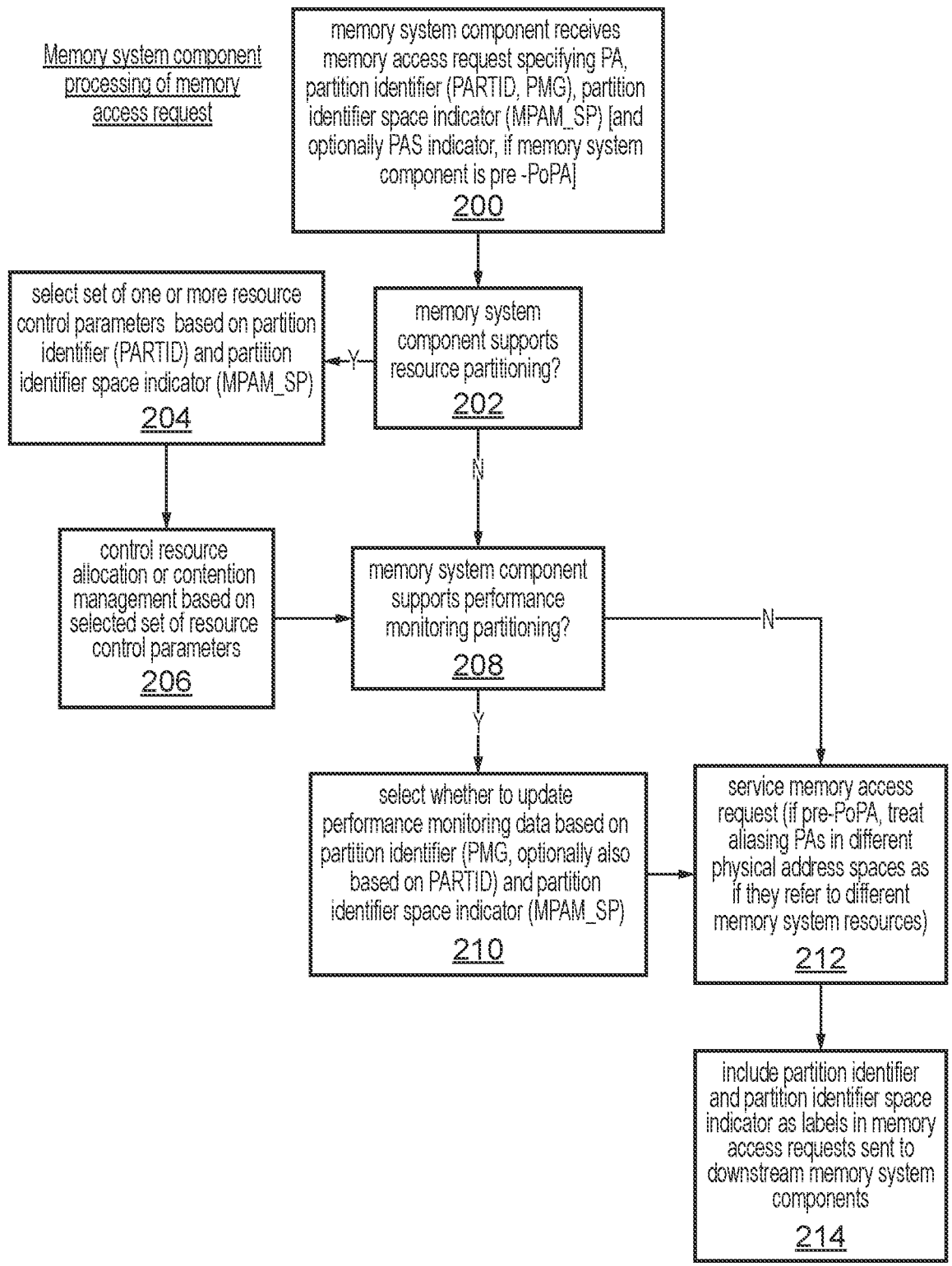
FIG. 17 is a flow diagram showing processing of a memory access request at the memory system component.

FIG. 17 is a flow diagram showing processing of a memory access request at the memory system component. At step 200 the memory system component receives the memory access request specifying the physical address (PA), the partition ID (PARTID and/or PMG), a partition ID space indicator (MPAM_SP) and optionally the PAS indicator, e.g. if the memory system component is upstream of the PoPA 60. At step 202 if the memory system component supports resource partitioning then the method proceeds to step 204 at which the resource control setting selection circuitry 400 selects a set of one or more resource control parameters 404 based on the resource control partition ID (PARTID) and the partition ID space indicator (MPAM_SP). At step 206 the resource usage control circuitry 406 controls resource allocation or contention management for the memory access request based on the selected set of resource control parameters 204. If the memory system component does not support resource partitioning then steps 204 and 206 are omitted.

If, at step 208, the memory system component supports performance monitoring partitioning then at step 210 the performance monitor selection and filtering circuitry 210 selects whether to update performance monitoring data 412 based on the partition ID (at least the performance monitoring group ID (PMG), but optionally also based on the resource control partition ID (PARTID) in some embodiments) and the partition ID space indicator MPAM_SP. For example a set of filter parameters 414 corresponding to the combination of the partition ID and the partition ID space indicator is selected and it is determined whether the memory access request meets these filter parameters and if so then a performance monitor 414 corresponding to the combination of the partition ID and partition ID space indicator is updated. If memory system component does not support performance monitoring partition then step 210 is omitted.

Regardless of whether the memory system component supports resource partitioning and/or performance monitoring partitioning, at step 212 the memory access request is serviced. If the memory system component is a pre-PoPA lying upstream of the PoPA 60 then aliasing physical addresses in different physical address spaces are treated as if they refer to different memory system resources. For example, if the memory system component is a cache then lookup of cache capacity may use the PAS indicator as part of the information for determining whether a given cache location corresponds to the requested data or instruction, for example by including the PAS indicator as part of the index value for selecting a set of the cache and/or tag value for determining whether a looked up cache location corresponds to the specified address. Effectively the PAS indicator could be treated as some additional address bits in the lookup of the cache. If the memory system component is a pre-PoPA memory controller or interconnect or other component which outputs requests on a bus then the PAS indicator may be supplied alongside the PA to qualify the PA and act as additional address bits.

At step 214 if any memory access request needs to be sent to a downstream memory system component (such a cache line fill request in the event of a cache miss, or a request sent on a bus by an interconnect or issued to a memory storage unit by a memory controller) then the partition ID and partition ID space indicators are included as labels attached to the request sent downstream so that downstream memory system components can also implement resource partitioning or performance monitoring partitioning. Also the PA and PAS indicator may also be supplied downstream, unless the memory system component is the PoPA memory system component which strips out the PAS to de-alias the physical address from different physical address spaces, in which case the PAS indicator could be omitted from the request sent downstream.

Bridging Between Regions Supporting Different Numbers of Partition ID Spaces

Figure 18:
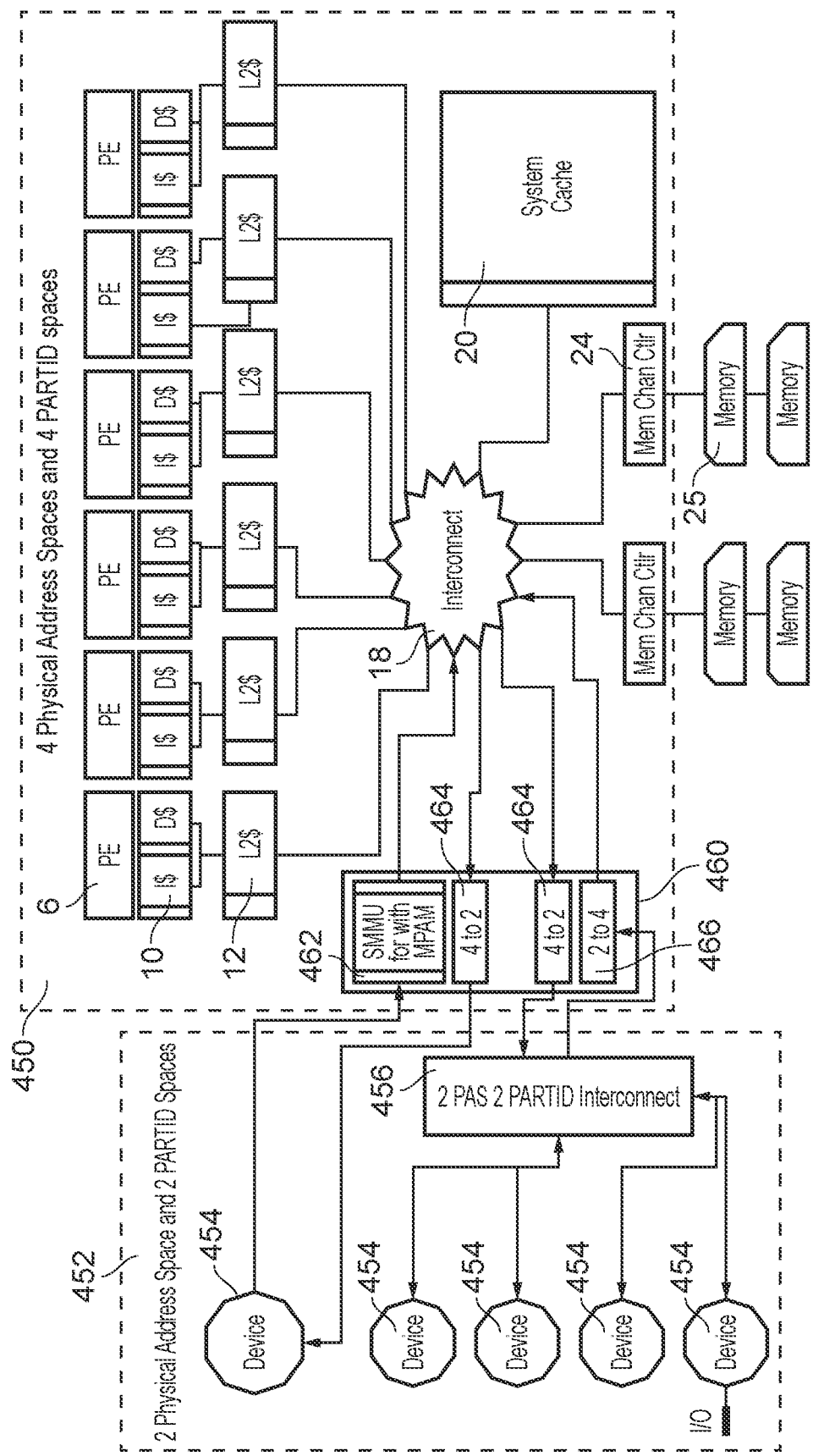
FIG. 18 illustrates an example of a processing system including bridging circuitry at a boundary between regions of the apparatus which support different numbers of partition ID spaces.

When building a data processing system such as a system on chip, while it can be useful for some components to support three or more partition ID spaces and three or more security domains as in the examples discussed above, there may be other memory system components which may support fewer domains and partition ID spaces. For compatibility with legacy devices it may be desirable to allow such devices supporting fewer partition ID spaces and security domains to coexist with the processing elements and memory system components that are as discussed above. Hence, as shown in FIG. 18 a data processing system may include a first region 450 comprising one or more components which support the at least three partition ID spaces and at least three security domains as discussed above, and a second region 452 of the apparatus which comprises one or more components supporting fewer partition ID spaces and security domains than the components within the first region. Bridging circuitry 460 may be provided to remap physical address space IDs and partition ID space indicators for memory access requests passing between the first region and the second region. For example at the boundary between the regions 450, 452 the four values of the physical address space indicator (PAS ID) can be mapped to selected values from a set of two physical address space values supported within region 452. Similarly, a 4:2 remapping of partition ID space indictors (MPAM_SP) can be performed. For requests issued from second region 452 to first region 450 a corresponding 2:4 domain/partition ID space remapping can be performed. The bridging circuitry 460 could in some cases include remapping circuitry which is combined with other functionality, for example a system memory management unit (SMMU) 462 which performs address translations on behalf of devices within the second region 452 could also perform the remapping at the bridge between the regions 450, 452. Alternatively dedicated bridging circuitry 464, 466 may be provided at the interface between the regions separate form any other functionality such as address translation. Separate bridging components could be provided for the 4:2 remapping for requests passing from first region 450 to second region 452 and the 2:4 remapping for requests passing from second region 452 to first region 450. A range of bridging techniques can be used to support legacy regions 452 under a variety of design goals. For 2 PAS and 2 PARTID space devices 454 making requests to the 4 PAS/PARTID region 450, a system MMU 462 can perform the mapping under control of software defined page tables. Alternatively, for a relatively inexpensive but inflexible solution, the device 454 can be wired with a static translation of Non-secure PAS to Non-secure PAS and Secure PAS to Secure PAS, and corresponding translation of Non-secure partition ID space to Non-secure partition ID space and Secure partition ID space to Secure partition ID space. Such legacy devices may encode the Non-secure/Secure partition ID space with a single bit indicator such that 0b1 indicates Non-secure and 0b0 indicates Secure, the encoding of MPAM_SP mentioned above with 0b00, 0b01, 0b10, 0b11 representing the Secure, Non-secure, Root and Realm partition ID space respectively can be useful as this allows the static mapping to be implemented simply by appending a more significant bit of 0 to the indication of the Non-secure/Secure requests received from the devices 454 in region 452. Nevertheless, static mappings would also be possible for other encodings of MPAM_SP.

When PEs 6 and other elements within the 4 PAS and 4 PARTID space region 450 make requests to devices in region 452, there are several options:

1. An inflexible static mapping turns Root PAS and Secure PAS into Secure PAS requests to the legacy device and turns Realm PAS and Non-secure PAS requests into Non-secure requests to the legacy component. Likewise, Root/Secure partition ID spaces are mapped to the Secure partition ID space and Realm/Non-secure PAS requests are mapped to Non-secure partition ID space. The encoding of MPAM_SP with 0b00, 0b01, 0b10, 0b11 representing the Secure, Non-secure, Root and Realm partition ID again helps to simplify the circuitry for performing this static mapping, as it means that the most significant bit of MPAM_SP can simply be discarded to provide a single-bit indicator indicating 0b1 for Non-secure and 0b0 for Secure as may be used by such legacy devices 454.

2. A simple programmable space mapper external to the legacy component 454 or legacy region 452. The space mapper controls whether Root partition ID space maps to Secure partition ID space or Non-secure partition ID space and whether Realm partition ID space maps to Secure partition ID space or Non-secure partition ID space.

a) The mapper could also select whether the Root PAS maps to Secure PAS or Non-secure PAS and whether Realm PAS maps to Secure PAS or Non-secure PAS. Alternatively, Root PAS could always be mapped as Secure and the Realm PAS could always be mapped as Non-secure, and in this case the programmable aspect of the mapper affects the partition ID mapping but not the PAS mapping.

b) The mapper could also indicate via a flag (e.g. NO_MON) whether requests from the Root partition ID space should not be monitored and whether requests from the Realm partition ID space should not be monitored (this may require a small redesign of the legacy component 454 to implement disabling of the monitoring when the flag indicates that monitoring should be disabled, but this may require less redevelopment effort than supporting all four partition ID spaces).

3. One of the mapper combinations from 2 could be implemented within a legacy component 454, requiring larger changes to the design of the component than those required by 2b.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to process instructions in one of at least three domains each associated with a different corresponding physical address space, and to issue to a memory system a memory access request specifying a target address indicative of a target memory system location;
partition identifier selection circuitry to select a partition identifier based on programmable partition identifier selection information associated with a current software execution environment which caused the memory access request to be issued; and
partition identifier space selection circuitry to select a selected partition identifier space from among at least three partition identifier spaces based on a current domain of the processing circuitry; in which:
the processing circuitry is configured to issue the memory access request to the memory system with the memory access request specifying the partition identifier and a partition identifier space indicator comprising a plurality of bits indicating the selected partition identifier space selected by the partition identifier space selection circuitry; and
the partition identifier space indicator and the partition identifier specified by the memory access request together represent information for selecting, at a memory system component of the memory system, a set of one or more memory system resource control parameters for controlling allocation of resources for handling the memory access request or managing contention for said resources, or selecting, at the memory system component, whether performance monitoring data is updated in response to the memory access request.

2. The apparatus according to claim 1, in which the partition identifier space selection circuitry is configured to select the selected partition identifier space based on the current domain of the processing circuitry and based on programmable control information.

3. The apparatus according to claim 2, in which the partition identifier space selection circuitry is configured to select, based on the programmable control information, whether the selected partition identifier space should be a primary partition identifier space associated with the current domain or an alternative partition identifier space associated with the current domain, where for at least one of the at least three domains, the alternative partition identifier space is the primary partition identifier space associated with a different domain.

4. The apparatus according to claim 3, in which the primary partition identifier space associated with a given domain is a fixed partition identifier space defined for the given domain independent of the programmable control information.

5. The apparatus according to claim 3, in which for at least one domain, the alternative partition identifier space associated with that domain is a partition identifier space variably selected depending on the programmable control information.

6. The apparatus according to claim 2, in which the processing circuitry is configured to process instructions at one of a plurality of privilege levels, and
for at least one privilege level, at least part of the programmable control information, which controls selection of the selected partition identifier space for memory access requests issued at the at least one privilege level, is programmable at a more privileged privilege level than the at least one privilege level.

7. The apparatus according to claim 6, in which for at least a subset of the at least one privilege level, the processing circuitry is configured to make accessible, to at least one instruction executed at a privilege level of that subset, forced space indicating information indicative of the selected partition identifier space selected based on the programmable control information programmable at the more privileged privilege level.

8. The apparatus according to claim 2, in which the processing circuitry is configured to process instructions at one of a plurality of privilege levels, and the programmable control information includes:
hierarchical control enable information programmable at a first privilege level; and
space selection control information programmable at a second privilege level less privileged than the first privilege level; in which:
when the hierarchical control information has a first value, the partition identifier selection circuitry is configured to select the selected partition identifier space for memory access requests issued at the second privilege level or a third privilege level less privileged than the second privilege level depending on the space selection control information programmable at the second privilege level; and
when the hierarchical control information has a second value, the partition identifier selection circuitry is configured to select the selected partition identifier space for memory access requests issued at the second privilege level or the third privilege level independent of the space selection control information programmable at the second privilege level.

9. The apparatus according to claim 1, in which a functional result of processing the memory access request is independent of the partition identifier and the selected partition identifier space.

10. The apparatus according to claim 1, comprising physical address space selection circuitry to select a selected physical address space for the memory access request based on the current domain, and the processing circuitry is configured to issue the memory access request specifying a physical address space indicator indicative of the selected physical address space.

11. The apparatus according to claim 10, in which the physical address space selection circuitry is configured to select the selected physical address space based on the current domain and based on physical address space selection information specified in an address translation entry providing address translation information corresponding to the target address of the memory access request.

12. The apparatus according to claim 11, in which the partition identifier space selection circuitry is configured to select the selected partition identifier space depending on the current domain and independent of the physical address space selection information specified in the address translation entry corresponding to the target address.

13. The apparatus according to claim 10, comprising:
a point of physical aliasing (PoPA) memory system component configured to de-alias a plurality of aliasing physical addresses from different physical address spaces which correspond to the same memory system resource, to map any of the plurality of aliasing physical addresses to a de-aliased physical address to be provided to at least one downstream memory system component; and
at least one pre-PoPA memory system component provided upstream of the PoPA memory system component, where the at least one pre-PoPA memory system component is configured to treat the aliasing physical addresses from different physical address spaces as if the aliasing physical addresses correspond to different memory system resources.

14. The apparatus according to claim 1, comprising a memory system component comprising at least one of:
resource control parameter selection circuitry to select the set of one or more memory system resource control parameters based on the partition identifier space indicator and the partition identifier; and/or
performance monitoring control circuitry to control, based on the partition identifier space indicator and the partition identifier, whether the performance monitoring data is updated in response to the memory access request.

15. The apparatus according to claim 14, in which each of the at least three partition identifier spaces is associated with a corresponding one of the at least three domains; and
a given set of memory system resource control parameters corresponding to a given partition identifier space is accessible in response to a memory access request issued specifying a target address in the physical address space corresponding to the domain associated with the given partition identifier space.

16. The apparatus according to claim 1, comprising bridging circuitry at a boundary between a first region of the apparatus comprising one or more components supporting the at least three partition identifier spaces and a second region of the apparatus comprising one or more components supporting fewer partition identifier spaces than the one or more components in the first region, where the bridging circuitry is configured to remap the partition identifier space indicator for a memory access request passing between the first region and the second region.

17. The apparatus according to claim 16, in which the bridging circuitry is configured to remap the partition identifier space indicator according to one of:
a fixed mapping; and
a programmable mapping.

18. The apparatus according to claim 16, in which the bridging circuitry is also configured to remap a physical address space indicator indicative of the selected physical address space associated with the memory access request passing between the first region and the second region.

19. A memory system component comprising:
memory access request receiving circuitry to receive a memory access request specifying a target address indicative of a target memory system location in a memory system, a partition identifier space indicator comprising a plurality of bits indicating a selected partition identifier space selected from among at least three partition identifier spaces, and a partition identifier associated with a current software execution environment which caused the memory access request to be issued; and
at least one of:
resource control circuitry to select a set of one or more memory system resource control parameters based on the partition identifier space indicator and the partition identifier specified by the memory access request, and based on the selected set of memory system resource control parameters, to control allocation of resources for handling the memory access request or manage contention for said resources; and/or
performance monitoring control circuitry to control, based on the partition identifier space indicator and the partition identifier specified by the memory access request, whether performance monitoring data is updated in response to the memory access request.

20. A method comprising:
processing instructions in one of at least three domains each associated with a different corresponding physical address space;
selecting a partition identifier based on programmable partition identifier selection information associated with a current software execution environment which caused the memory access request to be issued;
selecting a selected partition identifier space from among at least three partition identifier spaces based on a current domain of the processing circuitry; and
issuing to a memory system a memory access request specifying a target address indicative of a target memory system location, the partition identifier and a partition identifier space indicator comprising a plurality of bits indicating the selected partition identifier space; and
at least one of:
selecting a set of one or more memory system resource control parameters based on the partition identifier space indicator and the partition identifier specified by the memory access request, and based on the selected set of memory system resource control parameters, controlling allocation of resources for handling the memory access request or managing contention for said resources; and/or
controlling, based on the partition identifier space indicator and the partition identifier specified by the memory access request, whether performance monitoring data is updated in response to the memory access request.

* * * * *